US012720609B2

(12) United States Patent
Zhao et al.

(10) Patent No.: US 12,720,609 B2
(45) Date of Patent: Aug. 25, 2026

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/745,968

(22) Filed: Jun. 17, 2024

(65) Prior Publication Data

US 2024/0381442 A1 Nov. 14, 2024

Related U.S. Application Data

(63) Continuation of application No. PCT/CN2023/094094, filed on May 13, 2023.

(51) Int. Cl.
*H04W 74/0833* (2024.01)

(52) U.S. Cl.
CPC ................................ *H04W 74/0833* (2013.01)

(58) Field of Classification Search
CPC .......................... H04W 74/0833; H04W 74/00
See application file for complete search history.

(56) References Cited

U.S. PATENT DOCUMENTS

2016/0302235 A1* 10/2016 Hwang ............... H04W 52/146
2018/0368179 A1* 12/2018 He ...................... H04W 74/002
2019/0052339 A1* 2/2019 Zhou .................. H04B 7/06964
2020/0275477 A1* 8/2020 Shah ................... H04W 74/002
2021/0058971 A1* 2/2021 MolavianJazi ..... H04W 56/001

(Continued)

FOREIGN PATENT DOCUMENTS

CN 104186010 12/2014
CN 108347760 7/2018

(Continued)

OTHER PUBLICATIONS

3GPP TS 38.213 V17.5.0, "3rd Generation Partnership Project; Technical Specification Group Radio Access Network; NR; Physical layer procedures for control (Release 17)," Mar. 2023, 262 pages.

(Continued)

*Primary Examiner* — Siren Wei
(74) *Attorney, Agent, or Firm* — Fish & Richardson P.C.

(57) ABSTRACT

Provided are a method for a node used for wireless communication and an apparatus. On example method includes transmitting at least one uplink transmission on a first transmission occasion; wherein each of the at least one uplink transmission is one of a plurality of candidate transmissions; a power of each of the at least one uplink transmission is allocated according to a priority of the respective uplink transmission in a first priority order; the plurality of candidate transmissions comprise a first physical random access channel (PRACH) transmission, and the first PRACH transmission belongs to one of a plurality of PRACH transmission groups; and a priority of the first PRACH transmission is determined based on a PRACH transmission group to which the first PRACH transmission belongs.

20 Claims, 2 Drawing Sheets

(56) References Cited

U.S. PATENT DOCUMENTS

2024/0063857 A1* 2/2024 Zhang ................. H04W 52/146
2025/0048420 A1* 2/2025 Ly ..................... H04W 74/0833
2025/0240831 A1* 7/2025 Zhou ..................... H04W 72/23

FOREIGN PATENT DOCUMENTS

| | | |
|---|---|---|
| CN | 110506440 | 11/2019 |
| CN | 112335297 | 2/2021 |
| CN | 114303426 | 4/2022 |
| CN | 115462127 | 12/2022 |
| CN | 116456488 | 7/2023 |
| WO | WO 2020061774 | 4/2020 |
| WO | WO 2020215262 | 10/2020 |
| WO | WO 2022022645 | 2/2022 |

OTHER PUBLICATIONS

China Telecom, "Revised WID on Further NR coverage enhancements," 3GPP TSG RAN Meeting #96, RP-221858, Budapest, Hungary, Jun. 6-9, 2022, 5 pages.
International Search Report and Written Opinion in International Appln. No. PCT/CN2023/094094, mailed on Jan. 2, 2024, 18 pages (with English translation).
Office Action in Chinese Appln. No. 202380010769.9, mailed on Mar. 29, 2024, 9 pages (with English translation).
OPPO, "PRACH coverage enhancements," 3GPP TSG RAN WG1 #112 bis-e, R1-2302573, e-Meeting, Apr. 17-26, 2023, 6 pages.
Notice of Allowances in Chinese Appln. No. 202380010769.9, mailed on Jun. 19, 2024, 6 pages (with English translation).

* cited by examiner

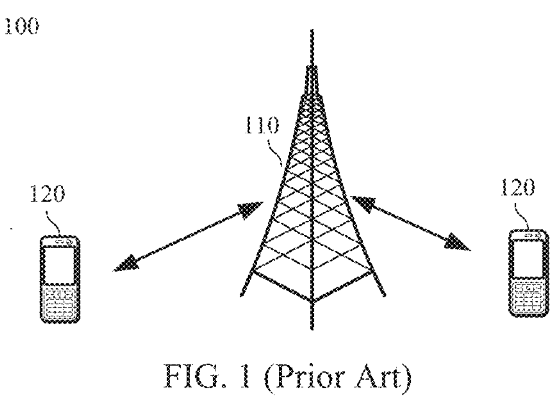
FIG. 1 (Prior Art)
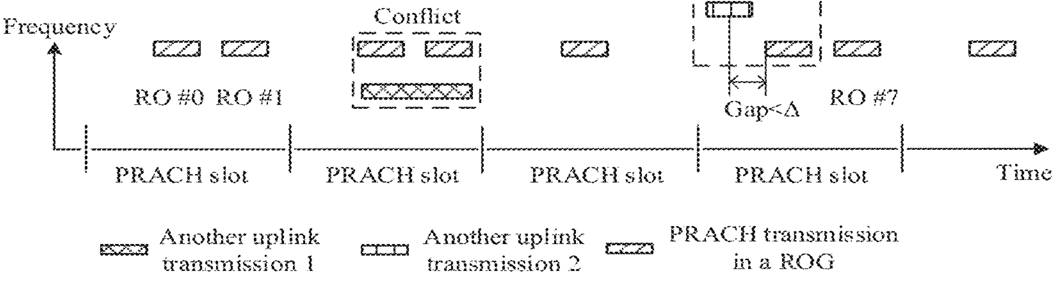
FIG. 2
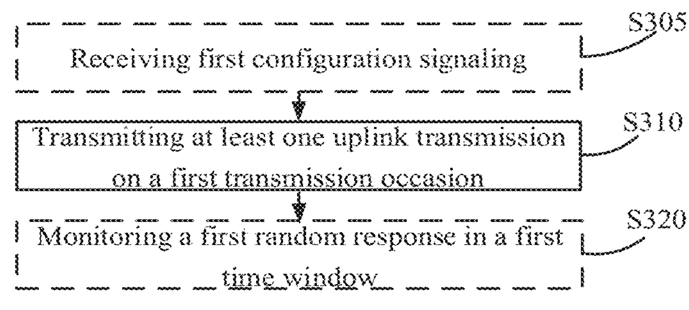
FIG. 3
Receiving at least one uplink transmission
S410
FIG. 4
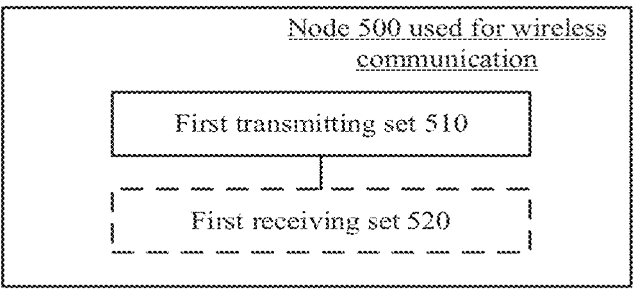
FIG. 5

METHOD FOR NODE USED FOR WIRELESS COMMUNICATION AND APPARATUS

CROSS-REFERENCE TO RELATED APPLICATIONS

This application is a continuation of International Application No. PCT/CN2023/094094, filed on May 13, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

In order to enhance coverage performance of a physical random access channel (PRACH), some communication systems (such as new radio (NR) systems) plan to introduce a solution of multiple PRACH transmissions.

In a scenario of multiple PRACH transmissions, a conflict may occur between the multiple PRACH transmissions and other transmissions, resulting in one or more of the following problems: how to reduce or avoid a conflict between multiple PRACH transmissions and other transmissions; or a conflict between multiple PRACH transmissions and other transmissions has relatively great impact on system performance (such as system resource consumption); or a conflict between multiple PRACH transmissions and other transmissions increases a random access delay; or a conflict between multiple PRACH transmissions and other transmissions causes poor performance of multiple PRACH transmissions; or a conflict between multiple PRACH transmissions and other transmissions causes a PRACH transmission to become a bottleneck for a coverage range of a communication system.

SUMMARY

Embodiments of the present application provide a method for a node used for wireless communication and an apparatus. Various aspects used in the present application are described below.

According to a first aspect, a first node used for wireless communication is provided, including: a first transmitting set, configured to transmit at least one uplink transmission on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first PRACH transmission, and the first PRACH transmission belongs to one of a plurality of PRACH transmission groups; and a priority of the first PRACH transmission is related to a PRACH transmission group to which the first PRACH transmission belongs.

In an implementation, the priority of the first PRACH transmission is related to both the PRACH transmission group to which the first PRACH transmission belongs and a cell in which the first PRACH transmission is located.

In an implementation, the priority of the first PRACH transmission is related to a carrier in which the first PRACH transmission is performed.

In an implementation, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an implementation, the plurality of PRACH transmission groups respectively correspond to a plurality of priority indexes, and the priority of the first PRACH transmission is related to a priority index corresponding to the PRACH transmission group to which the first PRACH transmission belongs.

In an implementation, the at least one uplink transmission includes the first PRACH transmission, and the first node further includes: a first receiving set, configured to monitor a first random response during a first time window in response to transmitting the first PRACH transmission, where a starting of the first time window is related to the PRACH transmission group to which the first PRACH transmission belongs.

In an implementation, the priority of the first PRACH transmission is related to a priority index of the first PRACH transmission, and the priority index of the first PRACH transmission is related to the PRACH transmission group to which the first PRACH transmission belongs.

In an implementation, the first node includes: a second receiving set, configured to receive first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an implementation, the priority of the first PRACH transmission satisfies one or more of following: the priority of the first PRACH transmission is higher than a priority of a physical uplink shared channel PUSCH transmission; the priority of the first PRACH transmission is higher than a priority of a physical uplink control channel PUCCH transmission; and the priority of the first PRACH transmission is higher than a priority of a sounding reference signal SRS transmission.

In an implementation, a PUSCH transmission includes a PUSCH with higher priority transmission and a PUSCH with lower priority transmission, a PUCCH transmission includes a PUCCH with higher priority transmission and a PUCCH with lower priority transmission, and the priority of the first PRACH transmission satisfies one or more of following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; and if the PRACH transmission group to which the first PRACH transmission belongs is the first PRACH transmission group, the priority of the first PRACH transmission is higher than a priority of each PRACH transmission in the second PRACH transmission group; if the PRACH transmission group to which the first PRACH transmission belongs is the second PRACH transmission group, the priority of the first PRACH transmission is lower than a priority of each PRACH transmission in the first PRACH transmission group.

In an implementation, the first priority order is predefined or is network-configured.

In an implementation, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an implementation, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

According to a second aspect, a second node used for wireless communication is provided, including: a first receiving set, configured to receive at least one uplink transmission, where the at least one uplink transmission is transmitted on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first physical random access channel PRACH transmission, and the first PRACH transmission belongs to one of a plurality of PRACH transmission groups; and a priority of the first PRACH transmission is related to a PRACH transmission group to which the first PRACH transmission belongs.

In an implementation, the priority of the first PRACH transmission is related to both the PRACH transmission group to which the first PRACH transmission belongs and a cell in which the first PRACH transmission is located.

In an implementation, the priority of the first PRACH transmission is related to a carrier in which the first PRACH transmission is performed.

In an implementation, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an implementation, the plurality of PRACH transmission groups respectively correspond to a plurality of priority indexes, and the priority of the first PRACH transmission is related to a priority index corresponding to the PRACH transmission group to which the first PRACH transmission belongs.

In an implementation, the at least one uplink transmission includes the first PRACH transmission, and the second node further includes: a first transmitting set, configured to transmit a first random response during a first time window in response to transmitting the first PRACH transmission, where a starting of the first time window is related to the PRACH transmission group to which the first PRACH transmission belongs.

In an implementation, the priority of the first PRACH transmission is related to a priority index of the first PRACH transmission, and the priority index of the first PRACH transmission is related to the PRACH transmission group to which the first PRACH transmission belongs.

In an implementation, the second node includes: a second transmitting set, configured to transmit first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an implementation, the priority of the first PRACH transmission satisfies one or more of following: the priority of the first PRACH transmission is higher than a priority of a physical uplink shared channel PUSCH transmission; the priority of the first PRACH transmission is higher than a priority of a physical uplink control channel PUCCH transmission; and the priority of the first PRACH transmission is higher than a priority of a sounding reference signal SRS transmission.

In an implementation, a PUSCH transmission includes a PUSCH with higher priority transmission and a PUSCH with lower priority transmission, a PUCCH transmission includes a PUCCH with higher priority transmission and a PUCCH with lower priority transmission, and the priority of the first PRACH transmission satisfies one or more of following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; and if the PRACH transmission group to which the first PRACH transmission belongs is the first PRACH transmission group, the priority of the first PRACH transmission is higher than a priority of each PRACH transmission in the second PRACH transmission group; if the PRACH transmission group to which the first PRACH transmission belongs is the second PRACH transmission group, the priority of the first PRACH transmission is lower than a priority of each PRACH transmission in the first PRACH transmission group.

In an implementation, the first priority order is predefined or is network-configured.

In an implementation, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an implementation, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

According to a third aspect, a method for a first node used for wireless communication is provided, including: transmitting at least one uplink transmission on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first physical random access channel PRACH transmission, and the first PRACH transmission belongs to one of a plurality of PRACH transmission groups; and a priority of the first PRACH transmission is related to a PRACH transmission group to which the first PRACH transmission belongs.

In an implementation, the priority of the first PRACH transmission is related to both the PRACH transmission group to which the first PRACH transmission belongs and a cell in which the first PRACH transmission is located.

In an implementation, the priority of the first PRACH transmission is related to a carrier in which the first PRACH transmission is performed.

In an implementation, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an implementation, the plurality of PRACH transmission groups respectively correspond to a plurality of priority indexes, and the priority of the first PRACH transmission is related to a priority index corresponding to the PRACH transmission group to which the first PRACH transmission belongs.

In an implementation, the at least one uplink transmission includes the first PRACH transmission, and the method further includes: monitoring a first random response during a first time window in response to transmitting the first PRACH transmission, where a starting of the first time window is related to the PRACH transmission group to which the first PRACH transmission belongs.

In an implementation, the priority of the first PRACH transmission is related to a priority index of the first PRACH transmission, and the priority index of the first PRACH transmission is related to the PRACH transmission group to which the first PRACH transmission belongs.

In an implementation, the method includes: receiving first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an implementation, the priority of the first PRACH transmission satisfies one or more of following: the priority of the first PRACH transmission is higher than a priority of a physical uplink shared channel PUSCH transmission; the priority of the first PRACH transmission is higher than a priority of a physical uplink control channel PUCCH transmission; and the priority of the first PRACH transmission is higher than a priority of a sounding reference signal SRS transmission.

In an implementation, a PUSCH transmission includes a PUSCH with higher priority transmission and a PUSCH with lower priority transmission, a PUCCH transmission includes a PUCCH with higher priority transmission and a PUCCH with lower priority transmission, and the priority of the first PRACH transmission satisfies one or more of following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; and if the PRACH transmission group to which the first PRACH transmission belongs is the first PRACH transmission group, the priority of the first PRACH transmission is higher than a priority of each PRACH transmission in the second PRACH transmission group; if the PRACH transmission group to which the first PRACH transmission belongs is the second PRACH transmission group, the priority of the first PRACH transmission is lower than a priority of each PRACH transmission in the first PRACH transmission group.

In an implementation, the first priority order is predefined or is network-configured.

In an implementation, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an implementation, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

According to a fourth aspect, a method for a second node used for wireless communication is provided, including: receiving at least one uplink transmission, where the at least one uplink transmission is transmitted on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first physical random access channel PRACH transmission, and the first PRACH transmission belongs to one of a plurality of PRACH transmission groups; and a priority of the first PRACH transmission is related to a PRACH transmission group to which the first PRACH transmission belongs.

In an implementation, the priority of the first PRACH transmission is related to both the PRACH transmission group to which the first PRACH transmission belongs and a cell in which the first PRACH transmission is located.

In an implementation, the priority of the first PRACH transmission is related to a carrier in which the first PRACH transmission is performed.

In an implementation, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an implementation, the plurality of PRACH transmission groups respectively correspond to a plurality of priority indexes, and the priority of the first PRACH transmission is related to a priority index corresponding to the PRACH transmission group to which the first PRACH transmission belongs.

In an implementation, the at least one uplink transmission includes the first PRACH transmission, and the method further includes: transmitting a first random response during a first time window in response to receiving the first PRACH transmission, where a starting of the first time window is related to the PRACH transmission group to which the first PRACH transmission belongs.

In an implementation, the priority of the first PRACH transmission is related to a priority index of the first PRACH transmission, and the priority index of the first PRACH transmission is related to the PRACH transmission group to which the first PRACH transmission belongs.

In an implementation, the method includes: transmitting first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an implementation, the priority of the first PRACH transmission satisfies one or more of following: the priority of the first PRACH transmission is higher than a priority of a physical uplink shared channel PUSCH transmission; the priority of the first PRACH transmission is higher than a priority of a physical uplink control channel PUCCH transmission; and the priority of the first PRACH transmission is higher than a priority of a sounding reference signal SRS transmission.

In an implementation, a PUSCH transmission includes a PUSCH with higher priority transmission and a PUSCH with lower priority transmission, a PUCCH transmission includes a PUCCH with higher priority transmission and a PUCCH with lower priority transmission, and the priority of the first PRACH transmission satisfies one or more of following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an implementation, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; and if the PRACH transmission group to which the first PRACH transmission belongs is the first PRACH transmission group, the priority of the first PRACH transmission is higher than a priority of each PRACH transmission in the second PRACH transmission group; if the PRACH transmission group to which the first PRACH transmission belongs is the second PRACH transmission group, the priority of the first PRACH transmission is lower than a priority of each PRACH transmission in the first PRACH transmission group.

In an implementation, the first priority order is predefined or is network-configured.

In an implementation, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an implementation, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

According to a fifth aspect, a first node used for wireless communication is provided, including a transceiver, a memory, and a processor, where the memory is configured to store a program, and the processor is configured to: invoke the program in the memory, and control the transceiver to receive or transmit a signal, so that the first node performs the method in any implementation of the third aspect.

According to a sixth aspect, a second node used for wireless communication is provided, including a transceiver, a memory, and a processor, where the memory is configured to store a program, and the processor is configured to: invoke the program in the memory, and control the transceiver to receive or transmit a signal, so that the second node performs the method in any implementation of the fourth aspect.

According to a seventh aspect, an embodiment of the present application provides a communication system, where the system includes the first node and/or the second node described above. In another possible design, the system may further include another device interacting with the first node or the second node in the solution provided in embodiments of the present application.

According to an eighth aspect, an embodiment of the present application provides a computer-readable storage medium. The computer-readable storage medium stores a computer program, and the computer program enables a computer to perform some or all of the steps in the method according to the foregoing aspects.

According to a ninth aspect, an embodiment of the present application provides a computer program product. The computer program product includes a non-transitory computer-readable storage medium storing a computer program, and the computer program is operable to enable a computer to perform some or all of the steps of the method according to the foregoing aspects. In some implementations, the computer program product may be a software installation package.

According to a tenth aspect, an embodiment of the present application provides a chip. The chip includes a memory and a processor, and the processor may invoke and run a computer program from the memory, to implement some or all of the steps of the method according to the foregoing aspects.

In embodiments of the present application, when a first node needs to transmit a plurality of candidate transmissions, the first node can determine a priority of a first PRACH transmission in the plurality of candidate transmissions based on a PRACH transmission group to which the first PRACH transmission belongs, which helps prevent the first PRACH transmission from colliding with another transmission in the plurality of candidate transmissions.

The method for a node used for wireless communication and the apparatus that are provided in embodiments of the present application help optimize a solution for a conflict between multiple PRACH transmissions and another transmission.

The method for a node used for wireless communication and the apparatus that are provided in embodiments of the present application help mitigate impact of a conflict between multiple PRACH transmissions and another transmission on system performance.

The method for a node used for wireless communication and the apparatus that are provided in embodiments of the present application help reduce a random access delay in the case of a conflict between multiple PRACH transmissions and another transmission.

The method for a node used for wireless communication and the apparatus that are provided in embodiments of the present application help improve performance gains of multiple PRACH transmissions.

The method for a node used for wireless communication and the apparatus that are provided in embodiments of the present application help increase coverage of a communication system.

The method for a node used for wireless communication and the apparatus that are provided in embodiments of the present application help improve utilization efficiency of a random access resource.

BRIEF DESCRIPTION OF THE DRAWINGS

FIG. 1 is an example diagram of a system architecture of a wireless communication system to which embodiments of the present application are applicable.

FIG. 2 shows an example of a conflict between multiple PRACH transmissions and other transmissions.

FIG. 3 is a schematic flowchart of a method for a first node used for wireless communication according to an embodiment of the present application.

FIG. 4 is a schematic flowchart of a method for a second node used for wireless communication according to an embodiment of the present application.

FIG. 5 is a schematic structural diagram of a node used for wireless communication according to an embodiment of the present application.

DETAILED DESCRIPTION OF THE EMBODIMENTS

Architecture of a Communication System

Figure 6:
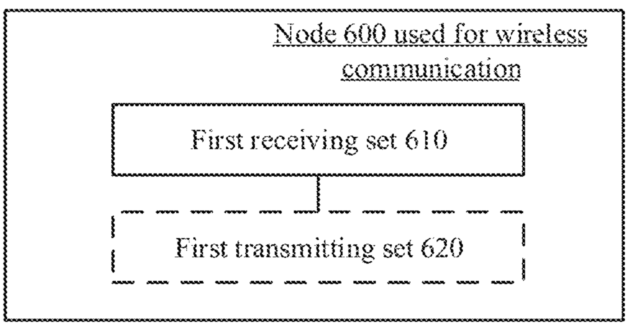
FIG. 6 is a schematic structural diagram of a node used for wireless communication according to another embodiment of the present application.

FIG. 1 is an example diagram of a system architecture of a wireless communication system 100 to which embodiments of the present application are applicable. The wireless communication system 100 may include a network device 110 and a user equipment 120. The network device 110 may be a device in communication with the user equipment 120. The network device 110 may provide communication coverage for a specific geographic area, and may communicate with the user equipment 120 located within the coverage.

FIG. 1 exemplarily shows one network device and two user equipments. Optionally, the wireless communication system 100 may include a plurality of network devices, and another number of user equipments may be included in coverage of each network device, which is not limited in embodiments of the present application.

Optionally, the wireless communication system 100 may further include other network entities such as a network controller and a mobility management entity, which is not limited in embodiments of the present application.

It should be understood that although the technical solutions of embodiments of the present application may be used for random access, the technical solutions of embodiments of the present application can also be used for beam failure recovery. Further, the technical solutions of embodiments of the present application may be used for a Type-1 random access procedure, and the technical solutions of embodiments of the present application can also be used for a Type-2 random access procedure. Further, the technical solutions of embodiments of the present application may be used for a Uu interface, and the technical solutions of embodiments of the present application can also be used for a PC5 interface. Further, the technical solutions of embodiments of the present application may be used for single-carrier communication, and the technical solutions of embodiments of the present application can also be used for multi-carrier communication. Further, the technical solutions of embodiments of the present application may be used for multi-antenna communication, and the technical solutions of embodiments of the present application can also be used for single-antenna communication. Further, although the technical solutions of embodiments of the present application may be used for a scenario of a user equipment and a base station, the technical solutions of embodiments of the present application are also applicable to a vehicle-to-everything (V2X) scenario, and a communication scenario in which a user equipment communicates with a relay and the relay communicates with a base station, which achieves a technical effect similar to that in the scenario of a user equipment and a base station. Further, the technical solutions of embodiments of the present application may be applied to various communication scenarios, such as an enhanced mobile broadband (eMBB) scenario, an ultra-reliable and low latency communications (URLLC) scenario, and a massive machine type communication (mMTC) scenario. In addition, using a unified solution for different scenarios may also help reduce hardware complexity and cost.

It should be understood that the technical solutions of embodiments of the present application may be applied to various communication systems, such as a $5^{th}$ generation (5G) system or a NR system, a long term evolution (LTE) system, an LTE frequency division duplex (FDD) system, and an LTE time division duplex (TDD) system. The technical solutions provided in the present application may be further applied to a future communication system, such as a $6^{th}$ generation mobile communication system or a satellite communication system. The user equipment in embodiments of the present application may also be referred to as terminal device, an access terminal, a subscriber unit, a subscriber station, a mobile site, a mobile station (MS), a mobile terminal (MT), a remote station, a remote terminal, a mobile device, a user terminal, a terminal, a wireless communication device, a user agent, or a user apparatus. The user equipment in embodiments of the present application may be a device providing a user with voice and/or data connectivity and may be used to connect to people, objects, and machines, such as a handheld device or vehicle-mounted device having a wireless connection function. The user equipment in embodiments of the present application may be a mobile phone, a tablet computer (Pad), a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to function as a base station. For example, the UE may function as a scheduling entity, and it provides a sidelink signal between UEs in V2X, D2D, or the like. For example, a cellular phone and a vehicle communicate with each other by using a sidelink signal. A cellular phone and a smart household device communicate with each other, without the relay of a communication signal through a base station.

The network device in embodiments of the present application may be a device for communicating with the user equipment. The network device may also be referred to as an access network device or a wireless access network device. For example, the network device may be a base station. The network device in embodiments of the present application may be a radio access network (RAN) node (or device) that connects the user equipment to a wireless network. The base station may broadly cover the following various names, or may be replaced with the following names, such as a NodeB, an evolved NodeB (eNB), a next generation NodeB (gNB), a relay station, an access point, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communication module, a modem, or a chip disposed in the device or apparatus described above. Alternatively, the base station may be a mobile switching center, a device that functions as a base station in device to device D2D, vehicle-to-everything (V2X), and machine-to-machine (M2M) communications, a network-side device in a 6G network, a device that functions as a base station in a future communication system, or the like. The base station may support networks with a same access technology or different access technologies. A specific technology and a specific device form used by the network device are not limited in embodiments of the present application.

The base station may be a fixed or mobile base station. For example, a helicopter or an unmanned aerial vehicle may be configured to function as a mobile base station, and one or more cells may move according to a position of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

The network device and the user equipment may be deployed on land, including being indoors or outdoors, handheld, or in-vehicle, may be deployed on a water surface, or may be deployed on a plane, a balloon, or a satellite in the air. A scenario in which the network device and the user equipment are located is not limited in embodiments of the present application.

It should be understood that all or some of functions of the communication device in the present application may also be implemented by software functions running on hardware, or by virtualization functions instantiated on a platform (for example, a cloud platform).

Coverage Enhancements of PRACH Transmissions

Coverage performance of a communication system (for example, an NR system) is an important factor needing to be considered when an operator performs commercial deployment of a communication network, because the coverage performance of the communication system directly affects service quality of the communication system and costs of the operator, for example, capital expenditure (CAPEX) of the operator and the operating expenditure (OPEX) of the operator.

Coverage performance of a communication system varies with different operating frequency bands of the communication system. For example, compared with an LTE system, the NR system uses a higher operating frequency band (for example, a millimeter-wave frequency band), which results in a larger path loss of the NR system, thereby resulting in a poorer coverage performance of the NR system. Therefore, as a frequency band supported by a communication system may become increasingly high, how to enhance coverage of the communication system becomes a problem to be resolved.

In most scenarios of practical deployment, since capability of a user equipment is lower than that of a network device, coverage performance of an uplink is a bottleneck for enhancing coverage of a communication system. With the development of communication technologies, uplink services, for example, a video uploading service, in some emerging vertical use cases gradually increase. In a scenario with many uplink services, how to enhance uplink coverage is a problem needing to be further resolved.

In the related art, there has been a technical solution of coverage enhancement for some uplinks. For example, in Release 17 (Rel-17) of the NR, a coverage enhancement solution has been designed for a physical uplink shared channel (PUSCH), a physical uplink control channel (PUCCH), and a message 3 (Msg3) in a random access procedure.

However, no coverage enhancement solution is designed for a PRACH in Rel-17, but PRACH transmission (PRACH transmission, or referred to as PRACH transmitting) performance is very important to many procedures such as an initial access procedure and a beam failure recovery procedure, and therefore, it is also very important to perform coverage enhancement on a PRACH. On such a basis, through the 3rd Generation Partnership Project (3GPP) RP-221858, a work item (WI) of "further NR coverage enhancements" was formally established in Rel-18, and enhancing coverage performance of PRACH transmission is one of the important topics of the work item.

In a possible implementation, multiple PRACH transmissions may be used for a coverage enhancement of PRACH transmissions. In other words, a coverage enhancement of PRACH transmissions may be implemented through repeated PRACH transmissions (for example, a preamble is transmitted in a PRACH a plurality of times). It should be noted that in the present application, multiple PRACH transmissions may also be replaced by a multi-PRACH transmission, a plurality of PRACH transfers, a multi-PRACH transfer, repeated PRACH transmissions, PRACH repeated transmissions, and a Type-3 random access procedure, and other terms. This is not limited in embodiments of the present application. In other words, the multiple PRACH transmissions mentioned in the present application may be replaced by at least one of a multi-PRACH transmission, a plurality of PRACH transfers, a multi-PRACH transfer, repeated PRACH transmissions, PRACH repeated transmissions, and a Type-3 random access procedure.

In embodiments of the present application, multiple PRACH transmissions may refer to multiple PRACH transmissions with a same beam, or may refer to multiple PRACH transmissions with different beams. Multiple PRACH transmissions with a same beam is used as an example. An agreement has been reached at 3GPP radio access network (RAN) 1 #110-bis-e meeting: PRACH occasions (or referred to as RACH occasions) at least at different time instances (time instances, or referred to as time points, temporal instances, or the like) may be used for multiple PRACH transmissions with a same beam. In other words, a physical random access channel occasion group (PRACH occasion group, ROG) may be used for multiple PRACH transmissions with a same beam.

In addition, the RAN1 #110bis-e meeting further defines the number of multiple PRACH transmissions with a same beam (times of multiple PRACH transmissions/repetition factor). Values of the number may at least include 2, 4, and 8. That is, a ROG may include 2, 4, or 8 valid physical random access channel occasions (PRACH occasions, ROs). The following further describes the ROG.

Physical Random Access Channel Occasion Group

In some scenarios, "ROG" is introduced to indicate a set of a plurality of ROs. Therefore, "ROG" may also be referred to as "RO set". A name of the ROG is not limited in embodiments of the present application. For ease of description, embodiments of the present application are described based on the ROG. A name of the physical random access channel occasion is not limited in embodiments of the present application. For example, the physical random access channel occasion may also be referred to as a random access occasion, or may also be referred to as a transmission occasion or the like. For ease of description, embodiments of the present application are described based on the physical random access channel occasion. The physical random access channel occasion, the random access occasion, and the transmission occasion mentioned in embodiments of the present application may be interchanged.

In an embodiment, the ROG may be used for multiple PRACH transmissions with a same beam.

In an embodiment, the ROG may include ROs corresponding to multiple PRACH transmissions with a same beam.

In an embodiment, it is also discussed in some meetings (for example, 3GPP RAN1 #110bis-e) that ROs located in different time instances may be used for multiple PRACH transmissions with a same beam. In other words, a plurality of ROs in a ROG may be located in different time instances.

In an embodiment, for a specific number of PRACH transmissions, a ROG includes a valid RO, which helps the specific number of PRACHs be transmitted through the valid RO. In an embodiment, all ROs in a ROG may be associated with one synchronization signal block (or referred to as synchronization signal/physical broadcast channel block, synchronization signal/physical broadcast channel block, SS/PBCH block, SSB). For brevity, the synchronization signal block is briefly referred to as an SSB, and may be arbitrarily interchanged with the SS/PBCH block. Certainly, in embodiments of the present application, one ROG may be associated with a plurality of SSBs.

As described above, there may be a plurality of uplink transmission types, such as PUSCH transmission, PUCCH transmission, PRACH transmission (for example, a single PRACH transmission, and multiple PRACH transmissions), and sounding reference signal (SRS) transmission. In some cases, a conflict may occur between the plurality of uplink transmissions. The following exemplarily describes cases in which a conflict may occur between a plurality of uplink transmissions.

In an embodiment, when a plurality of uplink transmissions overlap in time domain, a conflict may occur between the plurality of uplink transmissions. For example, when at least two of a PUSCH transmission, a PUCCH transmission, a single PRACH transmission, and an SRS transmission overlap in time domain, a conflict may occur between the plurality of uplink transmissions.

In an embodiment, when power allocated by a user equipment to a plurality of types of uplink transmissions on one transmission occasion exceeds a maximum transmit power value of the user equipment, a conflict may occur between the plurality of types of uplink transmissions.

In an embodiment, a conflict may occur between a plurality of types of uplink transmissions due to reasons such as: power allocation exceeding a limit due to dual connectivity, slot format determination, transmission occasions of a plurality of types of uplink transmissions at a same time resource position (such as a same slot), an excessively small gap between a plurality of types of uplink transmissions.

In the case of a conflict between a plurality of uplink transmissions, the user equipment may need to forgo a part of the uplink transmissions or reduce transmit power of a part of the uplink transmissions on a transmission occasion in which the conflict occurs. For example, the user equipment may need to forgo transmission of a PRACH or reduce transmit power of the PRACH on a transmission occasion in which a conflict occurs.

In a possible implementation, when a conflict occurs between at least two of a plurality of uplink transmissions including a single PRACH transmission, a PUSCH transmission, a PUCCH transmission, and an SRS transmission, the user equipment may allocate power in the following descending priority order or perform uplink transmission in the following descending priority order, to ensure that a total transmit power of the user equipment does not exceed a maximum transmit power. The descending priority order is as follows.

1. PRACH transmission on a primary cell (PCell).
2. PUCCH transmission or PUSCH transmission with a high priority index (higher priority index).
3. PUCCH transmissions or PUSCH transmissions with a same priority index.
   (1) PUCCH transmission with hybrid automatic repeat request-acknowledgment (HARQ-ACK) information, and/or a scheduling request (SR), and/or a link recovery request (LRR), or PUSCH transmission with HARQ-ACK information of the priority index;
   (2) PUCCH transmission with channel state information (CSI), or PUSCH transmission with CSI; and
   (3) PUSCH transmission without HARQ-ACK information of the priority index or CSI, PUSCH transmission of a Type-2 random access procedure, and PUSCH transmission on a PCell.
4. SRS transmission (an aperiodic SRS having a higher priority than a semi-persistent (semi-persistent) SRS and/or a periodic SRS), or PRACH transmission on a non-PCell.

It can be learned from the foregoing order that a PRACH transmission on a PCell has the highest priority, and is first transmitted in the case of a conflict between a plurality of uplink transmissions. Second, a PUCCH with higher priority and PUSCH are transmitted. Third, a PUCCH with lower priority and PUSCH are transmitted. At last, an SRS and PRACHs on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

However, the foregoing solution is a solution for a conflict between a single PRACH transmission and other transmissions. A solution for multiple PRACH transmissions requires transmission of a plurality of PRACHs on a plurality of ROs. Therefore, in the case of multiple PRACH transmissions, there is a larger probability that a conflict occurs between multiple PRACH transmissions and another transmission, which is described below with reference to FIG. 2.

FIG. 2 shows an example of a conflict between multiple PRACH transmissions and other transmissions (for example, other uplink transmissions). As shown in FIG. 2, multiple PRACH transmissions may be transmitted on a plurality of ROs (such as RO #0 to RO #7 in the figure). On some of the plurality of ROs, a conflict may occur because the multiple PRACH transmissions overlap another uplink transmission (such as another uplink transmission 1 in the figure) in time domain. On some of the plurality of ROs, a conflict may occur because a gap between the multiple PRACH transmissions and another uplink transmission (such as another uplink transmission 2 in the figure) is too small.

In summary, because a ROG occupied by multiple PRACH transmissions in one random access attempt includes a plurality of ROs, especially some ROGs each include a maximum of eight ROs, a probability of a conflict between the multiple PRACH transmissions and other transmissions significantly increases. In addition, one random access attempt may collide with a plurality of types of other transmissions.

In some cases, if resources of a ROG are network-configured, when a conflict between multiple PRACH transmissions and other transmissions frequently occurs, the user equipment may forgo all or a part of the PRACH transmissions. As a result, the user equipment may need to frequently occupy additional ROGs to retransmit PRACHs, so as to perform random access again. Therefore, multiple PRACH transmissions brings more serious system resource consumption than a single PRACH transmission, and leads to an increased delay in user equipment access.

In addition, at least one PRACH transmission of multiple PRACH transmissions in one random access attempt may collide with/overlap a single PRACH transmission. In this case, how the user equipment should avoid or resolve the conflict is also a problem needing to be resolved.

In other words, in a scenario of multiple PRACH transmissions, one or more of the following problems may appear: when a conflict occurs between multiple PRACH transmissions and other transmissions, there is a problem of how to handle the conflict by the user equipment; a conflict between multiple PRACH transmissions and other transmissions has relatively great impact on system performance (such as system resource consumption); a conflict between multiple PRACH transmissions and other transmissions increases a random access delay; performance of multiple PRACH transmissions is poor; PRACH transmission becomes a bottleneck for a coverage range of a communication system; and utilization efficiency of random access resources is low.

In view of the foregoing problems, embodiments of the present application provide a method for a node used for wireless communication and an apparatus, to determine a priority of a first PRACH transmission in a plurality of candidate transmissions based on a PRACH transmission group to which the first PRACH transmission belongs, so that one or more of the following objectives may be achieved: optimizing a solution for a conflict between multiple PRACH transmissions and other transmissions; reducing impact of a conflict between multiple PRACH transmissions and other transmissions on system performance; reducing a delay in random access when a conflict occurs between multiple PRACH transmissions and other transmissions; improving a performance gain of multiple PRACH transmissions, and increasing a coverage range; and improving utilization efficiency of random access resources.

The present application may be applied to a scenario of multiple PRACH transmissions, that is, repeated transmissions of a plurality of PRACHs may be used to implement a PRACH coverage enhancement.

The present application may be applied to a plurality of types of random access procedures. In an embodiment, embodiments of the present application may be applied to a 4-step random access procedure. In another embodiment, embodiments of the present application may be applied to a 2-step random access procedure. In an embodiment, embodiments of the present application may be applied to a contention-based random access procedure. In another embodiment, embodiments of the present application may be applied to a contention-free random access procedure.

The present application may be applied to random access procedure initiated (initiate) by different initiating manners. In an embodiment, embodiments of the present application may be applied to a random access procedure initiated by a physical downlink control channel (PDCCH) order. In another embodiment, embodiments of the present application may be applied to a random access procedure initiated by a medium access control (MAC) entity. In still another embodiment, embodiments of the present application may be applied to a random access procedure initiated by a radio resource control (RRC) event.

In an embodiment, the multiple PRACH transmissions mentioned in embodiments of the present application may refer to multiple PRACH transmissions with a same beam; in this case, repeated transmissions of a plurality of PRACHs are performed on a same beam to obtain a signal to noise ratio (SNR) gain.

In an embodiment, the multiple PRACH transmissions mentioned in embodiments of the present application may refer to multiple PRACH transmissions with different beams; in this case, repeated transmissions of a plurality of PRACHs are performed on different beams to obtain a diversity gain.

The methods and apparatus provided in the present application are exemplarily illustrated below by using a plurality of embodiments or examples. It should be understood that, in the case of no conflict, embodiments and features in the embodiments for the first node of the present application may be applied to a second node, and vice versa. In the case of no conflict, embodiments and the features in the embodiments of the present application may be arbitrarily combined with each other.

FIG. 3 is a schematic flowchart of a method for a node used for wireless communication according to an embodiment of the present application. The method shown in FIG. 3 may be performed by a first node. The following first briefly describes the first node.

In an embodiment, the first node may be any type of node, capable of transmitting at least one uplink transmission, in a communication system.

In an embodiment, the first node may be a user equipment, for example, user equipment 120 shown in FIG. 1.

In an embodiment, the first node may be a network-controlled repeater (NCR).

In an embodiment, the first node may be a relay, such as a relay terminal.

In an embodiment, the first node may include a first transmitting set.

In an embodiment, the first node may include one or more receiving sets. For example, the first node may include a first receiving set and a second receiving set.

The method shown in FIG. 3 is described below. As shown in FIG. 3, the method shown in FIG. 3 may include Step S310.

In Step S310, at least one uplink transmission is transmitted on a first transmission occasion.

The first transmission occasion is not specifically limited in embodiments of the present application. For example, the first transmission occasion may be a transmission occasion on any time resource position (such as a slot or a symbol), and the at least one uplink transmission may be transmitted on the time resource position. In an embodiment, the first transmission occasion may be a PRACH transmission occasion. In another embodiment, the first transmission occasion may be a PRACH transmission occasion and a PUSCH transmission occasion.

In an embodiment, a plurality of uplink transmissions in the at least one uplink transmission are frequency-division multiplexed.

In an embodiment, a plurality of uplink transmissions in the at least one uplink transmission do not overlap in frequency domain, or a plurality of uplink transmissions in the at least one uplink transmission are orthogonal in frequency domain.

In an embodiment, each uplink transmission in the at least one uplink transmission is one of a plurality of candidate transmissions.

The plurality of candidate transmissions are not specifically limited in embodiments of the present application. For example, the plurality of candidate transmissions may include a plurality of uplink transmissions; or the plurality of candidate transmissions may include a plurality of uplink transmissions and sidelink transmissions, and the like.

In an embodiment, the plurality of candidate transmissions include one or more of the following transmissions: a PUSCH transmission, a PUCCH transmission, a PRACH transmission, and an SRS transmission.

In an embodiment, when the plurality of candidate transmissions include a PRACH transmission, the PRACH transmission includes a single PRACH transmission and/or multiple PRACH transmissions.

In an embodiment, the plurality of candidate transmissions include one or more of the following transmissions: a PRACH transmission belonging to a first PRACH transmission group, and a PRACH transmission belonging to a second PRACH transmission group. For example, the first PRACH transmission group includes one or more PRACH transmissions, the second PRACH transmission group includes one or more PRACH transmissions, and the plurality of candidate transmissions include both at least one of the one or more PRACH transmissions included in the first PRACH transmission group and at least one of the one or more PRACH transmissions included in the second PRACH transmission group.

In an embodiment, in addition to the PRACH transmission belonging to the first PRACH transmission group and the PRACH transmission belonging to the second PRACH transmission group, the plurality of candidate transmissions may further include another PRACH transmission. For example, the plurality of candidate transmissions include one or more of the following transmissions: a PRACH transmission belonging to the first PRACH transmission group, a PRACH transmission belonging to the second PRACH transmission group, and a PRACH transmission belonging to a third PRACH transmission group.

In an embodiment, the plurality of candidate transmissions include one or more of the following transmissions: a PRACH transmission belonging to a first PRACH transmission group, a PRACH transmission belonging to a second PRACH transmission group, a PUSCH transmission, a PUCCH transmission, and an SRS transmission.

In an embodiment, a priority of each of the plurality of candidate transmissions is related to a first priority order.

In an embodiment, the first priority order is used to allocate power to the at least one uplink transmission. For example, in a case that a conflict occurs between the plurality of candidate transmissions on the first transmission occasion, the first priority order is used to allocate power to the at least one uplink transmission to ensure that the power allocated to the at least one uplink transmission does not exceed a maximum transmit power of the first node, thereby helping avoid a conflict between the plurality of candidate transmissions on the first transmission occasion.

In an embodiment, the first priority order is used to determine the at least one uplink transmission. For example, in a case that a conflict occurs between the plurality of candidate transmissions on the first transmission occasion, a priority order of the plurality of candidate transmissions is used to determine the at least one uplink transmission from the plurality of candidate transmissions, to transmit the at least one uplink transmission on the first transmission occasion, thereby helping avoid a conflict between the plurality of candidate transmissions on the first transmission occasion.

In an embodiment, the first priority order is used to determine a priority of each of the plurality of candidate transmissions.

In an embodiment, the first priority order is predefined. In other words, the first priority order is statically configured.

In an embodiment, the first priority order is network-configured.

For details about the first priority order, refer to subsequent description. Details are not described herein.

In an embodiment, the priority order of the plurality of candidate transmissions is used to allocate power to the at least one uplink transmission. For example, in a case that a conflict occurs between the plurality of candidate transmissions on the first transmission occasion, the priority order of the plurality of candidate transmissions is used to allocate power to the at least one uplink transmission to ensure that the power allocated to the at least one uplink transmission does not exceed a maximum transmit power of the first node, thereby helping avoid a conflict between the plurality of candidate transmissions on the first transmission occasion.

In an embodiment, the priority order of the plurality of candidate transmissions is used to determine the at least one uplink transmission. For example, in a case that a conflict occurs between the plurality of candidate transmissions on the first transmission occasion, the priority order of the plurality of candidate transmissions is used to determine the at least one uplink transmission from the plurality of candidate transmissions, to transmit the at least one uplink transmission on the first transmission occasion, thereby helping avoid a conflict between the plurality of candidate transmissions on the first transmission occasion.

In an embodiment, the plurality of candidate transmissions include a first PRACH transmission, and the first PRACH transmission belongs to one of a plurality of PRACH transmission groups.

In an embodiment, the first PRACH transmission is one of the plurality of candidate transmissions.

In an embodiment, each of the plurality of PRACH transmission groups includes at least one PRACH transmission.

In an embodiment, the plurality of PRACH transmission groups include the first PRACH transmission group and the second PRACH transmission group.

In a sub-embodiment of the foregoing embodiment, the first PRACH transmission belongs to the first PRACH transmission group. In another sub-embodiment, the first PRACH transmission belongs to the second PRACH transmission group.

In an embodiment, the plurality of PRACH transmission groups include the first PRACH transmission group, the second PRACH transmission group, and the third PRACH transmission group.

In a sub-embodiment of the foregoing embodiment, the first PRACH transmission belongs to the first PRACH transmission group. In another sub-embodiment, the first PRACH transmission belongs to the second PRACH transmission group. In still another sub-embodiment, the first PRACH transmission belongs to the third PRACH transmission group.

A division manner of the plurality PRACH transmission groups is not specifically limited in embodiments of the present application. In an embodiment, a number of PRACH transmissions included in each of the plurality of PRACH transmission groups is different. However, embodiments of the present application are not limited thereto. For example, each of the plurality of PRACH transmission groups is located on a different carrier.

For more details about the plurality of PRACH transmission groups, refer to subsequent description. For brevity, details are described herein.

In embodiments of the present application, a priority of the first PRACH transmission may be related to one or more factors, which is not limited in embodiments of the present application. It should be noted that the priority of the first PRACH transmission may also be understood as a priority of the first PRACH transmission in the plurality of candidate transmissions. The priority of the first PRACH transmission mentioned below may be interchanged with the priority of the first PRACH transmission in the plurality of candidate transmissions.

In an embodiment, the priority of the first PRACH transmission is related to at least one of a PRACH transmission group to which the first PRACH transmission belongs, a cell in which the first PRACH transmission is located, and a carrier in which the first PRACH transmission is performed. This is described below.

In an embodiment, the priority of the first PRACH transmission is related to the PRACH transmission group to which the first PRACH transmission belongs. For example, if the PRACH transmission group to which the first PRACH transmission belongs is the first PRACH transmission group, the priority of the first PRACH transmission is related to the first PRACH transmission group.

In embodiments of the present application, when the first node needs to transmit a plurality of candidate transmissions, the first node can determine a priority of a first PRACH transmission in the plurality of candidate transmissions based on a PRACH transmission group to which the first PRACH transmission belongs, which helps prevent the first PRACH transmission from colliding with another transmission in the plurality of candidate transmissions. Further, the following one or more objectives may be achieved in embodiments of the present application: optimizing a solution for a conflict between multiple PRACH transmissions and other transmissions; reducing impact of a conflict between multiple PRACH transmissions and other transmissions on system performance; reducing a delay in random access when a conflict occurs between multiple PRACH transmissions and other transmissions; improving a performance gain of multiple PRACH transmissions, and increasing a coverage range; and improving utilization efficiency of random access resources.

In an embodiment, the priority of the first PRACH transmission is related to the cell in which the first PRACH transmission is located. For example, the priority of the first PRACH transmission is related only to the cell in which the first PRACH transmission is located; or the priority of the first PRACH transmission is related to the PRACH transmission group to which the first PRACH transmission belongs and the cell in which the first PRACH transmission is located; or the priority of the first PRACH transmission is related to both the cell in which the first PRACH transmission is located and the carrier in which the first PRACH transmission is performed.

In an embodiment, that the priority of the first PRACH transmission is related to the cell in which the first PRACH transmission is located may mean that the cell in which the first PRACH transmission is located is used to determine the priority of the first PRACH transmission, or the priority of the first PRACH transmission is determined based on the cell in which the first PRACH transmission is located.

In an embodiment, the cell in which the first PRACH transmission is located is a primary cell.

In an embodiment, the cell in which the first PRACH transmission is located is a serving cell other than the primary cell. For example, the cell in which the first PRACH transmission is located is a serving cell of a primary secondary cell. Alternatively, the cell in which the first PRACH transmission is located is a serving cell of a secondary cell.

In an embodiment, the plurality of candidate transmissions include one or more of the following transmissions: a PRACH transmission that is on a primary cell and that belongs to the first PRACH transmission group, a PRACH transmission that is on a primary cell and that belongs to the second PRACH transmission group, a PRACH transmission that is on a non-primary cell and that belongs to the first PRACH transmission group, a PRACH transmission that is on a non-primary cell and that belongs to the second PRACH transmission group, a PUSCH transmission with a fourth priority index, a PUCCH transmission with a fourth priority index, a PUSCH transmission with a fifth priority index, a PUCCH transmission with a fifth priority index, and an SRS transmission.

In an embodiment, the fourth priority index is not equal to the fifth priority index. For example, a priority corresponding to the fourth priority index is higher than a priority corresponding to the fifth priority index. For other related content about the fourth priority index and the fifth priority index, refer to subsequent description.

In an embodiment, the priority of the first PRACH transmission is related to the carrier in which the first PRACH transmission is performed. For example, the priority of the first PRACH transmission is related only to the carrier in which the first PRACH transmission is performed; or the priority of the first PRACH transmission is related to both the PRACH transmission group to which the first PRACH transmission belongs and the carrier in which the first PRACH transmission is performed; or the priority of the first PRACH transmission is related to the transmission group to which the first PRACH transmission belongs, the cell in which the first PRACH transmission is located, and the carrier in which the first PRACH transmission is performed.

In an embodiment, that the priority of the first PRACH transmission is related to the carrier in which the first PRACH transmission is performed may mean that the carrier in which the first PRACH transmission is performed is used to determine the priority of the first PRACH transmission, or the priority of the first PRACH transmission is determined based on the carrier in which the first PRACH transmission is performed.

In a specific embodiment, that the priority of the first PRACH transmission is related to the transmission group to which the first PRACH transmission belongs, the cell in which the first PRACH transmission is located, and the carrier in which the first PRACH transmission is performed may be interchanged with the following: The transmission group to which the first PRACH transmission belongs, the cell in which the first PRACH transmission is located, and the carrier in which the first PRACH transmission is performed are jointly used to determine the priority of the first PRACH transmission; or the priority of the first PRACH transmission is jointly determined based on the transmission group to which the first PRACH transmission belongs, the cell in which the first PRACH transmission is located, and the carrier in which the first PRACH transmission is performed.

As mentioned above, the priority of the first PRACH transmission is related to the PRACH transmission group to which the first PRACH transmission belongs. In an embodiment, the priority of the first PRACH transmission is related to a number of PRACH transmissions included in the PRACH transmission group to which the first PRACH transmission belongs.

In a sub-embodiment of the foregoing embodiment, if the plurality of PRACH transmission groups are divided according to a number of PRACH transmissions included in a PRACH transmission group, or if a number of PRACH transmissions included in each of the plurality of PRACH transmission groups is different, that the priority of the first PRACH transmission is related to the PRACH transmission group to which the first PRACH transmission belongs may be understood as follows: The priority of the first PRACH transmission is related to the number of PRACH transmissions included in the PRACH transmission group to which the first PRACH transmission belongs.

In an embodiment, the PRACH transmission group to which the first PRACH transmission belongs is used to determine the priority of the first PRACH transmission, or the priority of the first PRACH transmission is determined based on the PRACH transmission group to which the first PRACH transmission belongs. For example, if the PRACH transmission group to which the first PRACH transmission belongs is the first PRACH transmission group, the first PRACH transmission group is used to determine the priority of the first PRACH transmission.

In an embodiment, the number of PRACH transmissions included in the PRACH transmission group to which the first PRACH transmission belongs is used to determine the priority of the first PRACH transmission.

In a sub-embodiment of the foregoing embodiment, if the plurality of PRACH transmission groups are divided according to a number of PRACH transmissions included in a PRACH transmission group, or if a number of PRACH transmissions included in each of the plurality of PRACH transmission groups is different, that the PRACH transmission group to which the first PRACH transmission belongs is used to determine the priority of the first PRACH transmission may be understood as follows: The number of PRACH transmissions included in the PRACH transmission group to which the first PRACH transmission belongs is used to determine the priority of the first PRACH transmission.

In an embodiment, that the priority of the first PRACH transmission is related to the PRACH transmission group to which the first PRACH transmission belongs may include or may be interchanged with the following: The priority of the first PRACH transmission is related to a priority index of the first PRACH transmission, and the priority index of the first PRACH transmission is related to the PRACH transmission group to which the first PRACH transmission belongs.

In an embodiment, that the priority of the first PRACH transmission is related to a priority index of the first PRACH transmission may include or may be interchanged with the following: The priority index of the first PRACH transmission is used to determine the priority of the first PRACH transmission, or the priority of the first PRACH transmission is determined based on the priority index of the first PRACH transmission.

In an embodiment, that the priority index of the first PRACH transmission is related to the PRACH transmission group to which the first PRACH transmission belongs may include or may be interchanged with the following: The PRACH transmission group to which the first PRACH transmission belongs is used to determine the priority index of the first PRACH transmission, or the priority index of the first PRACH transmission is determined based on the PRACH transmission group to which the first PRACH transmission belongs.

In an embodiment, that the priority index of the first PRACH transmission is related to the PRACH transmission group to which the first PRACH transmission belongs may include: the priority index of the first PRACH transmission is related to the number of PRACH transmissions included in the PRACH transmission group to which the first PRACH transmission belongs; or the number of PRACH transmissions included in the PRACH transmission group to which the first PRACH transmission belongs is used to determine the priority index of the first PRACH transmission; or the priority index of the first PRACH transmission is determined based on the number of PRACH transmissions included in the PRACH transmission group to which the first PRACH transmission belongs.

In an embodiment, the priority index of the first PRACH transmission is a first priority index or a second priority index.

In an embodiment, the first priority index is greater than the second priority index.

In an embodiment, a priority of a PRACH transmission with the first priority index is higher than a priority of a PRACH transmission with the second priority index. For example, if the priority index of the first PRACH transmission is the first priority index, the priority of the first PRACH transmission is higher than that of another PRACH transmission with the second priority index.

In an embodiment, "a PRACH transmission with the first priority index" is equivalent to that a priority index of the PRACH transmission is the first priority index. For example, "the first PRACH transmission with the first priority index" is equivalent to that the priority index of the first PRACH transmission is the first priority index.

In an embodiment, "a PRACH transmission with the second priority index" is equivalent to that a priority index of the PRACH transmission is the second priority index. For example, "another PRACH transmission with the second priority index" is equivalent to that a priority index of the another PRACH transmission is the second priority index.

In an embodiment, the first PRACH transmission belongs to the first PRACH transmission group, and the priority index of the first PRACH transmission is the first priority index.

In an embodiment, the first PRACH transmission belongs to the second PRACH transmission group, and the priority index of the first PRACH transmission is the second priority index.

In an embodiment, the priority index of the first PRACH transmission is one of a plurality of priority indexes.

For example, the plurality of priority indexes include a first priority index and a second priority index. The first priority index is used to indicate a high priority or a higher priority, and the second priority index is used to indicate a low priority or a lower priority. The priority index of the first PRACH transmission is the first priority index or the second priority index.

Alternatively, the plurality of priority indexes include a first priority index, a second priority index, and a third priority index. The first priority index is used to indicate the highest priority, the second priority index is used to indicate a higher priority, and the third priority index is used to indicate a low priority or the lowest priority. The priority index of the first PRACH transmission is one of the first priority index, the second priority index, and the third priority index.

In an embodiment, the plurality of candidate transmissions include one or more of the following transmissions: a PRACH transmission belonging to the first PRACH transmission group, a PRACH transmission belonging to the second PRACH transmission group, a PUSCH transmission with a fourth priority index, a PUCCH transmission with the fourth priority index, a PUSCH transmission with a fifth priority index, a PUCCH transmission with the fifth priority index, and an SRS transmission.

In an embodiment, the fourth priority index is a positive integer.

In an embodiment, the fifth priority index is a non-negative integer.

In an embodiment, the fourth priority index is not equal to the second priority index.

In an embodiment, the fourth priority index is greater than the second priority index.

In an embodiment, the fifth priority index is less than the first priority index.

As mentioned above, the first PRACH transmission belongs to one of a plurality of PRACH transmission groups. The plurality of PRACH transmission groups are described below in more detail.

In an embodiment, corresponding priorities of the plurality of PRACH transmission groups are the same. For example, the plurality of PRACH transmission groups include the first PRACH transmission group and the second PRACH transmission group, and a priority of the first PRACH transmission group is the same as a priority of the second PRACH transmission group.

In an embodiment, corresponding priorities of the plurality of PRACH transmission groups are different or partially different. For example, the plurality of PRACH transmission groups include the first PRACH transmission group and the second PRACH transmission group, and a priority of the first PRACH transmission group is different from a priority of the second PRACH transmission group. Alternatively, the plurality of PRACH transmission groups include the first PRACH transmission group, the second PRACH transmission group, and the third PRACH transmission group, and a priority of the first PRACH transmission group and a priority of the third PRACH transmission group are the same and are both different from a priority of the second PRACH transmission group.

In an embodiment, at least one PRACH transmission group of the plurality of PRACH transmission groups belongs to the first PRACH transmission group.

In an embodiment, each PRACH transmission group of the plurality of PRACH transmission groups belongs to the first PRACH transmission group.

In an embodiment, the first PRACH transmission group includes multiple PRACH transmissions, and the multiple PRACH transmissions included in the first PRACH transmission group are time-division multiplexed.

In an embodiment, the first PRACH transmission group includes multiple PRACH transmissions, and the multiple PRACH transmissions included in the first PRACH transmission group do not overlap in time domain, or the multiple PRACH transmissions included in the first PRACH transmission group are orthogonal in time domain.

In an embodiment, one PRACH transmission group of the plurality of PRACH transmission groups belongs to the second PRACH transmission group.

In an embodiment, the second PRACH transmission group includes only one PRACH transmission.

In an embodiment, at least one PRACH transmission group of the plurality of PRACH transmission groups belongs to the first PRACH transmission group, and one PRACH transmission group of the plurality of PRACH transmission groups belongs to the second PRACH transmission group.

In an embodiment, numbers of PRACH transmissions included in any two of the plurality of PRACH transmission groups are different.

In a sub-embodiment of the foregoing embodiment, the priority of the first PRACH transmission is related to the number of PRACH transmissions included in the transmission group to which the first PRACH transmission belongs. In other words, the number of PRACH transmissions included in the transmission group to which the first PRACH transmission belongs is used to determine the priority of the first PRACH transmission.

In an embodiment, the plurality of PRACH transmission groups respectively correspond to a plurality of priorities.

In a sub-embodiment of the foregoing embodiment, the priority of the first PRACH transmission is related to a priority corresponding to the PRACH transmission group to which the first PRACH transmission belongs.

In an embodiment, a priority of each of the plurality of PRACH transmission groups is predefined.

In an embodiment, a priority of each of the plurality of PRACH transmission groups is statically configured. For example, a priority of each of the plurality of PRACH transmission groups is predefined by a protocol.

In an embodiment, a priority of each of the plurality of PRACH transmission groups is network-configured. For example, a priority of each of the plurality of PRACH transmission groups is configured by a network through higher layer signaling (such as RRC signaling).

In an embodiment, the plurality of PRACH transmission groups respectively correspond to a plurality of priority indexes. In an embodiment, any two priority indexes of the plurality of priority indexes are different.

In a sub-embodiment of the foregoing embodiment, the priority of the first PRACH transmission is related to a priority index corresponding to the PRACH transmission group to which the first PRACH transmission belongs.

In an embodiment, a priority index corresponding to each of the plurality of PRACH transmission groups is network-configured, for example, is configured by a network through higher layer signaling (such as RRC signaling).

In an embodiment, the PRACH transmission group to which the first PRACH transmission belongs is the first PRACH transmission group.

In an embodiment, the first PRACH transmission group corresponds to a first priority index.

In an embodiment, the second PRACH transmission group corresponds to a second priority index.

In an embodiment, the first priority index is not equal to the second priority index.

In an embodiment, the first priority index is a positive integer.

In an embodiment, the second priority index is a non-negative integer.

In an embodiment, the first priority index is greater than the second priority index.

In an embodiment, the plurality of PRACH transmission groups include a first PRACH transmission group and a second PRACH transmission group, and a number of PRACH transmissions included in the first PRACH transmission group is different from a number of PRACH transmissions included in the second PRACH transmission group.

In a sub-embodiment of the foregoing embodiment, the number of PRACH transmissions included in the first PRACH transmission group is greater than the number of PRACH transmissions included in the second PRACH transmission group. However, embodiments of the present application are not limited thereto. In some embodiments, the number of PRACH transmissions included in the first PRACH transmission group is less than the number of PRACH transmissions included in the second PRACH transmission group.

In an embodiment, the first PRACH transmission group includes a plurality of PRACH transmissions, and the second PRACH transmission group includes only one PRACH transmission.

In a sub-embodiment of the foregoing embodiment, the number of PRACH transmissions included in the first PRACH transmission group is one of {2, 4, 8}.

In a sub-embodiment of the foregoing embodiment, the first PRACH transmission group includes 2 PRACH transmissions, and the second PRACH transmission group includes 1 PRACH transmission.

In a sub-embodiment of the foregoing embodiment, the first PRACH transmission group includes 4 PRACH transmissions, and the second PRACH transmission group includes 1 PRACH transmission.

In a sub-embodiment of the foregoing embodiment, the first PRACH transmission group includes 8 PRACH transmissions, and the second PRACH transmission group includes 1 PRACH transmission.

In an embodiment, the first PRACH transmission group includes multiple PRACH transmissions, the second PRACH transmission group includes multiple PRACH transmissions, and the number of PRACH transmissions included in the first PRACH transmission group is greater than the number of PRACH transmissions included in the second PRACH transmission group.

In a sub-embodiment of the foregoing embodiment, the number of PRACH transmissions included in the first PRACH transmission group is one of {4, 8}, and the number of PRACH transmissions included in the second PRACH transmission group is one of {2, 4}.

In a sub-embodiment of the foregoing embodiment, the first PRACH transmission group includes 4 PRACH transmissions, and the second PRACH transmission group includes 2 PRACH transmissions.

In a sub-embodiment of the foregoing embodiment, the first PRACH transmission group includes 8 PRACH transmissions, and the second PRACH transmission group includes 2 PRACH transmissions.

In a sub-embodiment of the foregoing embodiment, the first PRACH transmission group includes 8 PRACH transmissions, and the second PRACH transmission group includes 4 PRACH transmissions.

In an embodiment, the number of PRACH transmissions included in the first PRACH transmission group is not less than a first integer, and the number of PRACH transmissions included in the second PRACH transmission group is less than the first integer.

In an embodiment, the first integer is a positive integer.

A specific value of the first integer is not limited in embodiments of the present application. Several values of the first integer are given below as examples.

In an embodiment, the first integer is 2. The number of PRACH transmissions included in the first PRACH transmission group is not less than 2, and the number of PRACH transmissions included in the second PRACH transmission group is less than 2. For example, the number of PRACH transmissions included in the first PRACH transmission group is one of {2, 4, 8}, and the number of PRACH transmissions included in the second PRACH transmission group is 1.

In an embodiment, the first integer is 3 or 4. The number of PRACH transmissions included in the first PRACH transmission group is not less than 3 or 4, and the number of PRACH transmissions included in the second PRACH transmission group is less than 3 or less than 4. For example, the number of PRACH transmissions included in the first PRACH transmission group is one of {4, 8}, and the number of PRACH transmissions included in the second PRACH transmission group is one of {1, 2}.

In an embodiment, the first integer is any integer from 5 to 8. The number of PRACH transmissions included in the PRACH transmission group is not less than 5/6/7/8, and the number of PRACH transmissions included in the second PRACH transmission group is less than 5/6/7/8. For example, the number of PRACH transmissions included in the first PRACH transmission group is one of {8}, and the number of PRACH transmissions included in the second PRACH transmission group is one of {1, 2, 4}.

As mentioned above, the priority of the first PRACH transmission is related to the PRACH transmission group to which the first PRACH transmission belongs. For example, the priority of the first PRACH transmission is related to the number of PRACH transmissions included in the PRACH transmission group to which the first PRACH transmission belongs, or the number of PRACH transmissions included in the PRACH transmission group to which the first PRACH transmission belongs is used to determine the priority of the first PRACH transmission. The priority of the first PRACH transmission is described below in more detail.

In an embodiment, the priority of the first PRACH transmission satisfies one or more of following: the priority of the first PRACH transmission is higher than a priority of a PUSCH transmission; the priority of the first PRACH transmission is higher than a priority of a PUCCH transmission; and the priority of the first PRACH transmission is higher than a priority of an SRS transmission.

In a sub-embodiment of the foregoing embodiment, the priority of the first PRACH transmission satisfies one of the conditions mentioned above. For example, the priority of the first PRACH transmission is higher than the priority of the PUSCH transmission. In a specific example, the PRACH transmission group to which the first PRACH transmission belongs includes multiple PRACH transmissions, and the priority of the first PRACH transmission is higher than the priority of the PUSCH transmission. For another example, the priority of the first PRACH transmission is higher than the priority of the SRS transmission. In a specific example, the PRACH transmission group to which the first PRACH transmission belongs includes multiple PRACH transmissions, and the priority of the first PRACH transmission is higher than the priority of the SRS transmission.

In a sub-embodiment of the foregoing embodiment, the priority of the first PRACH transmission satisfies a plurality of conditions mentioned above. For example, the priority of the first PRACH transmission is higher than the priorities of the PUSCH transmission and the PUCCH transmission. For another example, the priority of the first PRACH transmission is higher than the priorities of the PUSCH transmission and the SRS transmission.

In an embodiment, in a case that the priority of the first PRACH transmission is higher than the priority of the SRS transmission, the priority of the first PRACH transmission may be higher than the priority of the PUSCH transmission or the PUCCH transmission, or may be lower than the priority of the PUSCH transmission or the PUCCH transmission, which is not limited in embodiments of the present application.

In an embodiment, the PUSCH transmission includes a PUSCH with higher priority transmission and a PUSCH with lower priority transmission, the PUCCH transmission includes a PUCCH with higher priority transmission and a PUCCH with lower priority transmission, and the priority of the first PRACH transmission satisfies one or more of following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In a sub-embodiment of the foregoing embodiment, the priority of the first PRACH transmission satisfies one of the conditions mentioned above. For example, the priority of the first PRACH transmission is higher than that of the PUSCH with higher priority transmission. In a specific example, the PRACH transmission group to which the first PRACH transmission belongs includes multiple PRACH transmissions, and the priority of the first PRACH transmission is higher than that of the PUSCH with higher priority transmission. For another example, the priority of the first PRACH transmission is lower than that of the PUSCH with lower priority transmission. In a specific example, the PRACH transmission group to which the first PRACH transmission belongs includes multiple PRACH transmissions, and the priority of the first PRACH transmission is lower than the PUSCH with lower priority transmission.

In a sub-embodiment of the foregoing embodiment, the priority of the first PRACH transmission satisfies a plurality of conditions mentioned above. For example, the priority of the first PRACH transmission is higher than that of the PUSCH with higher priority transmission and that of the PUSCH with lower priority transmission. For another example, the priority of the first PRACH transmission is higher than that of the PUSCH with lower priority transmission, and that of the PUCCH with lower priority transmission.

In an embodiment, the priority of the first PRACH transmission is related to both the PRACH transmission group to which the first PRACH transmission belongs and a cell in which the first PRACH transmission is located. For example, the PRACH transmission group to which the first PRACH transmission belongs includes multiple PRACH transmissions, a priority of the first PRACH transmission on a primary cell is higher than a priority of the PUSCH transmission, and a priority of the first PRACH transmission on a non-primary cell is lower than a priority of the PUSCH transmission. Alternatively, the PRACH transmission group to which the first PRACH transmission belongs includes multiple PRACH transmissions, and both a priority of the first PRACH transmission on a primary cell and a priority of the first PRACH transmission on a non-primary cell are higher than a priority of the PUSCH transmission. Alternatively, the PRACH transmission group to which the first PRACH transmission belongs includes multiple PRACH transmissions, a priority of the first PRACH transmission on a primary cell is higher than that of the PUSCH with higher priority transmission, and a priority of the first PRACH transmission on a non-primary cell is lower than that of the PUSCH with higher priority transmission and higher than that of the PUSCH with lower priority transmission. For brevity, examples are not listed one by one in the present application.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. If the PRACH transmission group to which the first PRACH transmission belongs is the first PRACH transmission group, the priority of the first PRACH transmission is higher than a priority of each PRACH transmission in the second PRACH transmission group. If the PRACH transmission group to which the first PRACH transmission belongs is the second PRACH transmission group, the priority of the first PRACH transmission is lower than a priority of each PRACH transmission in the first PRACH transmission group.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. A priority of each PRACH transmission in the first PRACH transmission group is higher than a priority of each PRACH transmission in the second PRACH transmission group.

In an embodiment, the priority of the first PRACH transmission is related to the PRACH transmission group to which the first PRACH transmission belongs. The following describes the priority of the first PRACH transmission group by using an example in which the plurality of PRACH transmission groups include a first PRACH transmission group and a second PRACH transmission group, a number of PRACH transmissions included in the first PRACH transmission group is greater than a number of PRACH transmissions included in the second PRACH transmission group (for example, the first PRACH transmission group includes multiple PRACH transmissions, and the second PRACH transmission includes one PRACH transmission), and the PRACH transmission group to which the first PRACH transmission belongs is the first PRACH transmission group.

In an embodiment, the priority of the first PRACH transmission group satisfies one or more of following: the priority of the first PRACH transmission group is higher than the priority of the PUSCH transmission; the priority of the first PRACH transmission group is higher than the priority of the PUCCH transmission; the priority of the first PRACH transmission group is higher than the priority of the SRS transmission; and the priority of the first PRACH transmission group is higher than the priority of the second PRACH transmission group.

In an embodiment, the priority of the first PRACH transmission group satisfies one of the conditions mentioned above. For example, the priority of the first PRACH transmission group is higher than the priority of the PUSCH transmission; or the priority of the first PRACH transmission group is higher than the priority of the SRS transmission; and so on.

In an embodiment, the priority of the first PRACH transmission group satisfies a plurality of (at least two) conditions mentioned above. For example, the priority of the first PRACH transmission group is higher than the priority of the PUSCH transmission and higher than the priority of the PUCCH transmission; or the priority of the first PRACH transmission group is higher than the priority of the SRS transmission and is higher than the priority of the second PRACH transmission group; and so on.

In an embodiment, in a case that the first PRACH transmission group includes multiple PRACH transmissions, the priority of the first PRACH transmission group is higher than priorities of the PUSCH transmission, the PUCCH transmission, and the SRS transmission. In this way, priorities of multiple PRACH transmissions are improved, which helps resolve problems of a larger resource consumption and a longer access delay caused by forgoing or reduction of transmit power of multiple PRACH transmissions.

In an embodiment, the PUSCH transmission includes a PUSCH with higher priority transmission and a PUSCH with lower priority transmission. For example, the PUSCH transmission includes a PUSCH transmission with a fourth priority index and a PUSCH transmission with a fifth priority index, and the fourth priority index is, for example, higher than the fifth priority index.

In an embodiment, the priority of the first PRACH transmission group satisfies one or more of following: the priority of the first PRACH transmission group is higher than that of the PUSCH with higher priority transmission; the priority of the first PRACH transmission group is higher than that of the PUSCH with lower priority transmission; the priority of the first PRACH transmission group is lower than that of the PUSCH with higher priority transmission and higher than that of the PUSCH with lower priority transmission; the priority of the first PRACH transmission group is higher than the priority of the SRS transmission; and the priority of the first PRACH transmission group is higher than the priority of the second PRACH transmission group.

In an embodiment, the priority of the first PRACH transmission group satisfies one of the conditions mentioned above. For example, the priority of the first PRACH transmission group is higher than that of the PUSCH with higher priority transmission. Alternatively, the priority of the first PRACH transmission group is lower than that of the PUSCH with higher priority transmission and higher than that of the PUSCH with lower priority transmission. Alternatively, the priority of the first PRACH transmission group is higher than the PUSCH with lower priority transmission, in this case, the priority of the first PRACH transmission group may be higher than the PUSCH with higher priority transmission, or may be lower than the PUSCH with higher priority transmission, which is not limited in embodiments of the present application.

In an embodiment, the priority of the first PRACH transmission group satisfies a plurality of conditions mentioned above. For example, the priority of the first PRACH transmission group is higher than that the PUSCH with higher priority transmission and higher than that of the PUSCH with lower priority transmission; or the priority of the first PRACH transmission group is higher than that of the PUSCH with lower priority transmission and higher than the priority of the SRS transmission; and so on.

In an embodiment, the priority of the first PRACH transmission group is indicated by a priority index corresponding to the first PRACH transmission group.

It should be understood that a priority or a priority index of each PRACH transmission group (such as the first PRACH transmission group) of the plurality of PRACH transmission groups is related to the first priority order. The first priority order is described below in detail.

In an embodiment, the first priority order is a candidate order of a plurality of candidate orders.

In an embodiment, first configuration signaling is used to determine the plurality of candidate orders.

Still refer to FIG. 3. In an embodiment, the method in this embodiment of the present application further includes Step 305. It should be understood that a dotted box in FIG. 3 is used to indicate that Step S305 is an optional step.

In Step S305, the first configuration signaling is received, and the first configuration signaling is used to determine the plurality of candidate orders.

In an embodiment, the first configuration signaling is used to indicate the plurality of candidate orders.

In an embodiment, the first configuration signaling is used to indicate the PRACH transmission group to which the first PRACH transmission belongs, and the plurality of PRACH transmission groups correspond to the plurality of candidate orders. In this way, the first node can determine, based on the PRACH transmission group to which the first PRACH transmission belongs, a candidate order corresponding to the PRACH transmission group to which the first PRACH transmission belongs.

For example, the plurality of candidate orders include a first candidate order and a second candidate order, the plurality of PRACH transmission groups include a first PRACH transmission group and a second PRACH transmission group, the first PRACH transmission group corresponds to the first candidate order, and the second PRACH transmission group corresponds to the second candidate order. In this case, when the first configuration signaling indicates that the PRACH transmission group to which the first PRACH transmission belongs is the first PRACH transmission group, it can be determined that a candidate order corresponding to the PRACH transmission group to which the first PRACH transmission belongs is the first candidate order. When the first configuration signaling indicates that the PRACH transmission group to which the first PRACH transmission belongs is the second PRACH transmission group, it can be determined that a candidate order corresponding to the PRACH transmission group to which the first PRACH transmission belongs is the second candidate order.

In an embodiment, the first configuration signaling is received by the first node by using the second receiving set.

In an embodiment, any candidate order of the plurality of candidate orders is used to indicate a priority of any candidate transmission of the plurality of candidate transmissions.

In an embodiment, the plurality of candidate orders are predefined. In other words, the plurality of candidate orders are statically configured.

In an embodiment, the plurality of candidate orders are network-configured.

In an embodiment, the priority of each of the plurality of candidate transmissions is related to one of the plurality of candidate orders.

In an embodiment, the priority of the first PRACH transmission is related to one of the plurality of candidate orders.

In an embodiment, the first priority order is related to the PRACH transmission group to which the first PRACH transmission belongs.

In an embodiment, the plurality of candidate orders include a first candidate order and a second candidate order, and the first priority order is one of the first candidate order and the second candidate order.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. When the first PRACH transmission belongs to the first PRACH transmission group, the first priority order is the first candidate order; or when the first PRACH transmission belongs to the second PRACH transmission group, the first priority order is the second candidate order.

In an embodiment, the first PRACH transmission group includes multiple PRACH transmissions, and the second PRACH transmission group includes only one PRACH transmission. When the first PRACH transmission belongs to the first PRACH transmission group, the first priority order is the first candidate order; or when the first PRACH transmission belongs to the second PRACH transmission group, the first priority order is the second candidate order.

In an embodiment, the first priority order includes the priority order of the PRACH transmission group to which the first PRACH transmission belongs. In other words, the first priority order includes a priority order of multiple PRACH transmissions.

In an embodiment, the first priority order is related to the cell in which the first PRACH transmission is located.

In an embodiment, the first priority order includes a priority order of the cell in which the first PRACH transmission is located.

In an embodiment, the first priority order is related to the carrier in which the first PRACH transmission is performed.

In an embodiment, the PRACH transmission group to which the first PRACH transmission belongs is used to determine the first priority order from the plurality of candidate orders.

In an embodiment, when the PRACH transmission group to which the first PRACH transmission belongs is the first PRACH transmission group, the first priority order is a first candidate order; and when the PRACH transmission group to which the first PRACH transmission belongs is the second PRACH transmission group, the first priority order is a second candidate order. The first candidate order and the second candidate order are respectively two candidate orders of the plurality of candidate orders.

In a sub-embodiment of the foregoing embodiment, the first PRACH transmission group includes multiple PRACH transmissions, and the second PRACH transmission group includes only one PRACH transmission.

In an embodiment, the PRACH transmission group to which the first PRACH transmission belongs is the first PRACH transmission group, the first priority order is a first candidate order, and the first candidate order is one of the plurality of candidate orders.

In an embodiment, the PRACH transmission group to which the first PRACH transmission belongs is the second PRACH transmission group, the first priority order is a second candidate order, and the second candidate order is one of the plurality of candidate orders.

In an embodiment, the first candidate order is different from the second candidate order.

In an embodiment, the first priority order includes: the first PRACH transmission group is arranged before the PUCCH transmission, the PUSCH transmission, and the SRS transmission. In other words, multiple PRACH transmissions are arranged before the PUCCH transmission, the PUSCH transmission, and the SRS transmission.

In an embodiment, the first priority order includes: the first PRACH transmission group on a primary cell is arranged before the PUCCH transmission, the PUSCH transmission, and the SRS transmission; and the first PRACH transmission group on a non-primary cell is arranged after the PUCCH transmission and the PUSCH transmission. In other words, multiple PRACH transmissions on the primary cell are arranged before the PUCCH transmission, the PUSCH transmission, and the SRS transmission; and multiple PRACH transmissions on the non-primary cell are arranged after the PUCCH transmission and the PUSCH transmission.

In an embodiment, the first priority order includes: the first PRACH transmission group on a primary cell is arranged before the PUCCH with higher priority transmission and the PUSCH with higher priority transmission. In other words, multiple PRACH transmissions are arranged before the PUCCH with higher priority transmission and the PUSCH with higher priority transmission.

In an embodiment, the first priority order includes: the first PRACH transmission group on a non-primary cell is arranged after the PUCCH with higher priority transmission and the PUSCH with higher priority transmission. In other words, multiple PRACH transmissions on the non-primary cell are arranged after the PUCCH with higher priority transmission and the PUSCH with higher priority transmissions. In an example, the first PRACH transmission group on a non-primary cell may be arranged before the PUCCH with lower priority transmission and the PUSCH with lower priority transmission. In another example, the first PRACH transmission group on a non-primary cell may be arranged after the PUCCH with lower priority transmission and the PUSCH with lower priority transmission.

In an embodiment, the first priority order includes: the first PRACH transmission group on a non-primary cell is arranged before the PUCCH with lower priority transmission and the PUSCH with lower priority transmission. For example, the first PRACH transmission group on the non-primary cell is arranged before the PUCCH with lower priority transmission and the PUSCH with lower priority transmission, and is arranged before the PUCCH with higher priority transmission and the PUSCH with higher priority transmission. Alternatively, the first PRACH transmission group on the non-primary cell is arranged before the PUCCH with lower priority transmission and the PUSCH with lower priority transmission, and is arranged after the PUCCH with higher priority transmission and the PUSCH with higher priority transmission.

In an embodiment, when a plurality of PRACH transmission groups correspond to a plurality of priority indexes, the first priority order is related to the plurality of priority indexes corresponding to the plurality of PRACH transmission groups.

In an embodiment, the plurality of priority indexes include a high-priority index and a low-priority index. In other words, the plurality of priority indexes include a first priority index and a second priority index, and a priority corresponding to the first priority index is higher than a priority corresponding to the second priority index.

In an embodiment, the first priority order includes one or more of following: multiple PRACH transmissions on a primary cell are arranged before the PUCCH transmission, the PUSCH transmission, and the SRS transmission; high-priority multiple PRACH transmissions on a non-primary cell are arranged before the PUCCH transmission, the PUSCH transmission, and the SRS transmission; and low-priority multiple PRACH transmissions on a non-primary cell are arranged after the PUCCH transmission and the PUSCH transmission.

In an embodiment, the first priority order includes one or more of following: multiple PRACH transmissions on a primary cell are arranged before the PUCCH transmission, the PUSCH transmission, and the SRS transmission; high-priority multiple PRACH transmissions on a non-primary cell are arranged after the PUCCH transmission and the PUSCH transmission; high-priority multiple PRACH transmissions on a non-primary cell are arranged before the SRS transmission; and low-priority multiple PRACH transmissions on a non-primary cell are arranged after the PUCCH transmission and the PUSCH transmission.

In an embodiment, the first priority order includes one or more of following: multiple PRACH transmissions on a primary cell are arranged before the PUCCH transmission, the PUSCH transmission, and the SRS transmission; high-priority multiple PRACH transmissions on a non-primary cell are arranged before the PUCCH with higher priority transmission and the PUSCH with higher priority transmission; high-priority multiple PRACH transmissions on a non-primary cell are arranged after the PUCCH with higher priority transmission and the PUSCH with higher priority transmission; low-priority multiple PRACH transmissions on a non-primary cell are arranged after the PUCCH with higher priority transmission and the PUSCH with higher priority transmissions; and low-priority multiple PRACH transmissions on a non-primary cell are arranged after the PUCCH with lower priority transmission and the PUSCH with lower priority transmission.

In an embodiment, the plurality of priority indexes include a highest priority index, a higher priority index, and a low-priority index. In other words, the plurality of priority indexes include a first priority index, a second priority index, and a third priority index, and priorities corresponding to the first priority index, the second priority index, and the third priority index decrease in sequence.

In an embodiment, the first priority order includes one or more of following: multiple PRACH transmissions on a primary cell are arranged before the PUCCH transmission, the PUSCH transmission, and the SRS transmission; highest-priority multiple PRACH transmissions on a non-primary cell are arranged before the PUCCH with higher priority transmission and the PUSCH with higher priority transmission; higher-priority multiple PRACH transmissions on a non-primary cell are arranged after the PUCCH with higher priority transmission and the PUSCH with higher priority transmission; higher-priority multiple PRACH transmissions on a non-primary cell are arranged before the PUCCH with lower priority transmission and the PUSCH with lower priority transmission; low-priority multiple PRACH transmissions on a non-primary cell are arranged after the PUCCH with higher priority transmission and the PUSCH with higher priority transmissions; and low-priority multiple PRACH transmissions on a non-primary cell are arranged after the PUCCH with lower priority transmission and the PUSCH with lower priority transmission.

In an embodiment, in a carrier aggregation scenario, if a plurality of uplink transmissions have a same priority order, the first node gives priority to power allocation for transmission on a primary cell in a master cell group (MCG) or a secondary cell group (SCG), rather than power allocation for transmission on a secondary cell.

In an embodiment, when priority orders are the same and there are two UL carriers, a UE preferentially allocates transmission power on a carrier configured with a PUCCH transmission. If no PUCCH is configured in two UL carriers, transmission power of a non-supplementary UL carrier is preferentially allocated.

For ease of understanding, priorities of multiple PRACH transmissions (for example, the first PRACH transmission group) and the first priority order mentioned in embodiments of the present application are exemplarily described below with several examples. It should be noted that the following examples are not intended to limit the technical solutions of the present application.

Example 1

In Example 1, priorities of multiple PRACH transmissions on a non-PCell are predefined, for example, predefined by a protocol. In other words, priorities of multiple PRACH transmissions on a non-PCell are statically configured.

In Example 1, priorities of multiple PRACH transmissions are higher than those of all PUCCH transmissions or PUSCH transmissions or SRS transmissions. Improving the priorities of the multiple PRACH transmissions helps avoid or reduce problems of a large resource consumption and a long access delay caused by the multiple PRACH transmissions.

For example, in Example 1, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Single PRACH transmission on a PCell or multiple PRACH transmissions on a PCell.
2. Multiple PRACH transmissions on a non-PCell.
3. PUCCH transmission or PUSCH transmission with a high-priority index (higher-priority index).
4. PUCCH transmissions or PUSCH transmissions with a same priority index.
   (1) PUCCH transmission with HARQ-ACK information, and/or an SR, and/or an LRR, or PUSCH transmission with HARQ-ACK information of the priority index;
   (2) PUCCH transmission with CSI, or PUSCH transmission with CSI; and
   (3) PUSCH transmission without HARQ-ACK information of the priority index or CSI, PUSCH transmission of a type-2 random access procedure, and PUSCH transmission on a PCell.
5. SRS transmission (an aperiodic SRS having a higher priority than a semi-persistent SRS and/or a periodic SRS), or single PRACH transmission on a non-PCell.

It can be learned from the foregoing order that the PRACH transmission on the PCell (including a single PRACH transmission on the PCell and multiple PRACH transmissions on the PCell) has the highest priority, and is first transmitted in a case that a conflict occurs between a plurality of uplink transmissions. Second, multiple PRACH transmissions on a non-PCell are transmitted. Third, a PUCCH with higher priority and PUSCH are transmitted. Fourth, a PUCCH with lower priority and PUSCH are transmitted. At last, SRS and PRACHs on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

Example 2

In Example 2, priorities of multiple PRACH transmissions on a non-PCell cell are predefined or statically configured, for example, predefined by a protocol.

In Example 2, the priority of multiple PRACH transmissions is lower than a PUCCH transmission or PUSCH transmission with a higher priority index.

For example, in Example 2, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Single PRACH transmission on a PCell or multiple PRACH transmissions on a PCell.
2. PUCCH transmission or PUSCH transmission with a high-priority index (higher-priority index).
3. Multiple PRACH transmissions on a non-PCell.
4. PUCCH transmissions or PUSCH transmissions with a same priority index.
   (1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

5. SRS transmission (an aperiodic SRS having a higher priority than a semi-persistent SRS and/or a periodic SRS), or single PRACH transmission on a non-PCell.

It can be learned from the foregoing order that the PRACH transmission on the PCell (including a single PRACH transmission on the PCell and multiple PRACH transmissions on the PCell) has the highest priority, and is first transmitted in the case of a conflict between a plurality of uplink transmissions. Second, a PUCCH with higher priority and PUSCH are transmitted. Third, multiple PRACH transmissions on a non-PCell are transmitted. Fourth, a PUCCH with lower priority and PUSCH are transmitted. At last, SRS and PRACHs on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

Example 3

In Example 3, priorities of multiple PRACH transmissions on a non-PCell are indicated by priority indexes.

In Example 3, the priority indexes of the multiple PRACH transmissions on the non-PCell are network-configured, for example, is configured by a network through RRC signaling.

In Example 3, two priority indexes {p0, p1} are configured for the multiple PRACH transmissions on the non-PCell. The priority index p0 indicates a low priority, and the priority index p1 indicates a high priority.

For example, in Example 3, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Single PRACH transmission on a PCell or multiple PRACH transmissions on a PCell.
2. Multiple PRACH transmissions with a high-priority index (higher priority index, such as p1) on a non-PCell.
3. PUCCH transmission or PUSCH transmission with a high-priority index (higher-priority index).
4. PUCCH transmissions or PUSCH transmissions with a same priority index.

(1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

5. SRS transmission (an aperiodic SRS having a higher priority than a semi-persistent SRS and/or a periodic SRS), or single PRACH transmission on a non-PCell, or multiple PRACH transmissions with a low priority index (for example, p0) on a non-PCell.

It can be learned from the foregoing order that the PRACH transmission on the PCell (including a single PRACH transmission on the PCell and multiple PRACH transmissions on the PCell) has the highest priority, and is first transmitted in the case of a conflict between a plurality of uplink transmissions. Second, multiple PRACH transmissions with a high priority on a non-PCell are transmitted. Third, a PUCCH with higher priority and PUSCH are transmitted. Fourth, a PUCCH with lower priority and PUSCH are transmitted. At last, an SRS or a single PRACH on a non-PCell is transmitted, and multiple PRACH transmissions with a low priority on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

Example 4

In Example 4, priorities of multiple PRACH transmissions on a non-PCell are indicated by priority indexes.

In Example 4, the priority indexes of the multiple PRACH transmissions on the non-PCell are network-configured, for example, are configured by a network through RRC signaling.

In Example 4, two priority indexes {p0, p1} are configured for the multiple PRACH transmissions on the non-PCell. The priority index p0 indicates a low priority, and the priority index p1 indicates a high priority.

For example, in Example 4, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Single PRACH transmission on a PCell or multiple PRACH transmissions on a PCell.
2. PUCCH transmission or PUSCH transmission with a high-priority index (higher-priority index).
3. Multiple PRACH transmissions with a high-priority index (higher priority index, such as p1) on a non-PCell.
4. PUCCH transmissions or PUSCH transmissions with a same priority index.

(1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

5. SRS transmission (an aperiodic SRS having a higher priority than a semi-persistent SRS and/or a periodic SRS), or single PRACH transmission on a non-PCell, or multiple PRACH transmissions with a low priority index (for example, p0) on a non-PCell.

It can be learned from the foregoing order that the PRACH transmission on the PCell (including a single PRACH transmission on the PCell and multiple PRACH transmissions on the PCell) has the highest priority, and is first transmitted in the case of a conflict between a plurality of uplink transmissions. Second, a PUCCH with higher priority and PUSCH are transmitted. Third, multiple PRACH transmissions with a high priority on a non-PCell are transmitted. Fourth, a PUCCH with lower priority and PUSCH are transmitted. At last, an SRS or a PRACH on a non-PCell is transmitted, and multiple PRACH transmissions with a low priority on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

Example 5

In Example 5, priorities of multiple PRACH transmissions on a non-PCell are indicated by priority indexes.

In Example 5, the priority indexes of the multiple PRACH transmissions on the non-PCell are network-configured, for example, are configured by a network through RRC signaling.

In Example 5, a plurality of priority indexes {p0, p1, p2} are configured for the multiple PRACH transmissions on the non-PCell. The priority index p0 indicates a lowest priority, the priority index p1 indicates a higher priority, and the priority index p2 indicates the highest priority.

For example, in Example 5, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Single PRACH transmission on a PCell or multiple PRACH transmissions on a PCell.
2. Multiple PRACH transmissions with a highest priority index (for example, p2) on a non-Pcell.
3. PUCCH transmission or PUSCH transmission with a high-priority index (higher-priority index).
4. Multiple PRACH transmissions with a higher priority index (for example, p1) on a non-PCell.
5. PUCCH transmissions or PUSCH transmissions with a same priority index.

(1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

6. SRS transmission (an aperiodic SRS having a higher priority than a semi-persistent SRS and/or a periodic SRS), or single PRACH transmission on a non-PCell, or multiple PRACH transmissions with a low priority index (for example, p0) on a non-PCell.

It can be learned from the foregoing order that the PRACH transmission on the PCell (including a single PRACH transmission on the PCell and multiple PRACH transmissions on the PCell) has the highest priority, and is first transmitted in the case of a conflict between a plurality of uplink transmissions. Second, multiple PRACH transmissions with the highest priority on a non-PCell are transmitted. Third, a PUCCH with higher priority and PUSCH are transmitted. Fourth, multiple PRACH transmissions with a higher priority on a non-PCell are transmitted. Fifth, a PUCCH with lower priority and PUSCH are transmitted. At last, an SRS or a PRACH on a non-PCell is transmitted, and multiple PRACH transmissions with a low priority on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

It should be noted that in Example 1 to Example 5 mentioned above, according to the first priority order listed above, multiple PRACH transmissions and a single PRACH transmission are allocated with power or are determined whether to forgo transmission of them.

However, embodiments of the present application are not limited thereto. For example, according to a first priority order and a second priority order respectively, multiple PRACH transmissions and a single PRACH transmission may be allocated with power or may be determined whether to forgo transmission of them. The following is exemplarily described with reference to Example 6 and Example 7.

It should be noted that when a single PRACH transmission is allocated with power or is determine whether to forgo transmission of it according to the second priority order, for the second priority order, reference may be made to the foregoing described descending priority order used when a conflict occurs between at least two of a plurality of uplink transmissions including a single PRACH transmission, a PUSCH transmission, a PUCCH transmission, and an SRS transmission, or reference may be made to related description in Section 7.5 of 3GPP TS38.213. For brevity, details are not described herein.

Example 6

In Example 6, priorities of multiple PRACH transmissions on a non-PCell cell are predefined or statically configured, for example, predefined by a protocol.

In Example 6, the priority of the multiple PRACH transmissions is higher than those of all PUCCH transmissions or PUSCH transmissions or SRS transmissions. Improving the priorities of the multiple PRACH transmissions helps avoid or reduce problems of a large resource consumption and a long access delay caused by the multiple PRACH transmissions.

For example, in Example 6, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Multiple PRACH transmissions on a PCell.
2. Multiple PRACH transmissions on a non-PCell.
3. PUCCH transmission or PUSCH transmission with a high-priority index (higher-priority index).
4. PUCCH transmissions or PUSCH transmissions with a same priority index.

(1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

5. SRS transmission (an aperiodic SRS having a higher priority than a semi-persistent SRS and/or a periodic SRS).

It can be learned from the foregoing order that multiple PRACH transmissions on a PCell have the highest priority, and are first transmitted in the case of a conflict between a plurality of uplink transmissions. Second, multiple PRACH transmissions on a non-PCell are transmitted. Third, a PUCCH with higher priority and PUSCH are transmitted. Fourth, a PUCCH with lower priority and PUSCH are transmitted. At last, an SRS is transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

Example 7

In Example 7, priorities of multiple PRACH transmissions on a non-PCell are indicated by priority indexes.

In Example 7, the priority indexes of the multiple PRACH transmissions on the non-PCell are network-configured, for example, are configured by a network through RRC signaling.

In Example 7, two priority indexes {p0, p1} are configured for the multiple PRACH transmissions on the non-PCell. The priority index p0 indicates a low priority, and the priority index p1 indicates a high priority.

For example, in Example 7, when a conflict occurs between any PRACH transmission of the multiple PRACH transmissions and a plurality of uplink transmissions, a first node (such as a user equipment) allocates power according to a first priority order, to ensure that a total transmit power of the first node does not exceed a maximum transmit power value. The first priority order is as follows.

1. Multiple PRACH transmissions on a PCell.
2. PUCCH transmission or PUSCH transmission with a high-priority index (higher-priority index).
3. Multiple PRACH transmissions with a high-priority index (higher priority index, such as p1) on a non-PCell.
4. PUCCH transmissions or PUSCH transmissions with a same priority index.

(1) PUCCH transmission with HARQ-ACK information, and/or an SR, and/or an LRR, or PUSCH transmission with HARQ-ACK information of the priority index;

(2) PUCCH transmission with CSI, or PUSCH transmission with CSI; and (3) PUSCH transmission without HARQ-ACK information of the priority index or CSI, PUSCH transmission of a type-2 random access procedure, and PUSCH transmission on a PCell.

5. SRS transmission (an aperiodic SRS having a higher priority than a semi-persistent SRS and/or a periodic SRS), or multiple PRACH transmissions with a low priority index (for example, p0) on a non-PCell.

It can be learned from the foregoing order that multiple PRACH transmissions on a PCell have the highest priority, and are first transmitted in the case of a conflict between a plurality of uplink transmissions. Second, a PUCCH with higher priority and PUSCH are transmitted. Third, multiple PRACH transmissions with a high priority on a non-PCell are transmitted. Fourth, a PUCCH with lower priority and PUSCH are transmitted. At last, an SRS and multiple PRACH transmissions with a low priority on a non-PCell are transmitted.

When priorities of a plurality of PUCCHs and/or PUSCHs are the same, a PUCCH with HARQ-ACK information, an SR, or an LRR may be transmitted preferentially, or a PUSCH with HARQ-ACK information may be transmitted preferentially; then a PUCCH with CSI or a PUSCH with CSI is transmitted; finally, a PUSCH without HARQ-ACK information or CSI is transmitted, a PUSCH of a Type-2 random access procedure is transmitted, and a PUSCH on a PCell is transmitted; and so on.

It should be noted that the foregoing examples are not exhaustive, but are merely a part of examples listed to facilitate understanding. For brevity, other examples are not listed.

It should be further noted that in the examples listed above (such as Example 3 and Example 4), a number of PRACH transmissions included in the multiple PRACH transmissions may be used to determine priority indexes of the multiple PRACH transmissions. In other words, a number of ROs occupied by multiple PRACH transmissions may be used to determine priority indexes of the multiple PRACH transmissions.

As mentioned above, at least one uplink transmission transmitted on the first transmission occasion is one of a plurality of candidate transmissions. In an embodiment, the at least one uplink transmission includes the first PRACH transmission. In other words, in some embodiments, a PRACH transmission (for example, the first PRACH transmission) may be transmitted on the first transmission occasion. In this case, a first random response corresponding to the first PRACH transmission may be further monitored in embodiments of the present application.

Still refer to FIG. 3. In an embodiment, the method in embodiments of the present application may further include Step S320. It should be understood that a dotted box in FIG. 3 is used to indicate that Step S320 is an optional step.

In Step S320, as a response to the first PRACH transmission, the first random response is monitored during a first time window. A starting of the first time window is related to a PRACH transmission group to which the first PRACH transmission belongs.

In an embodiment, that a starting of the first time window is related to the PRACH transmission group to which the first PRACH transmission belongs may include or may be interchanged with the following: The PRACH transmission group to which the first PRACH transmission belongs is used to determine the starting of the first time window.

In an embodiment, a starting of the first time window is related to a number of PRACH transmissions included in the PRACH transmission group to which the first PRACH transmission belongs. In other words, the number of PRACH transmissions included in the PRACH transmission group to which the first PRACH transmission belongs is used to determine the starting of the first time window.

In an embodiment, a starting of the first time window is located after the last multi-carrier symbol of the last random access occasion in the PRACH transmission group to which the first PRACH transmission belongs.

In an embodiment, a starting of the first time window is located after the last multi-carrier symbol of the last random access occasion of a plurality of random access occasions included in the PRACH transmission group to which the first PRACH transmission belongs.

In an embodiment, a starting of the first time window is located after the last multi-carrier symbol of the 1$^{st}$ random access occasion in the PRACH transmission group to which the first PRACH transmission belongs.

In an embodiment, a starting of the first time window is located after the last multi-carrier symbol of the 1$^{st}$ random access occasion of a plurality of random access occasions included in the PRACH transmission group to which the first PRACH transmission belongs.

In an embodiment, a length of the first time window is related to the PRACH transmission group to which the first PRACH transmission belongs.

In an embodiment, that a length of the first time window is related to the PRACH transmission group to which the first PRACH transmission belongs may include or may be interchanged with the following: The PRACH transmission group to which the first PRACH transmission belongs is used to determine the length of the first time window.

In an embodiment, a length of the first time window is related to a number of PRACH transmissions included in the PRACH transmission group to which the first PRACH transmission belongs. In other words, the number of PRACH transmissions included in the PRACH transmission group to which the first PRACH transmission belongs is used to determine the length of the first time window.

In an embodiment, the first time window is a random access response window (RAR window).

In an embodiment, the first time window is used to receive a random access response.

In an embodiment, that the first time window is used to receive a random access response may include or may be interchanged with: monitoring the random access response during the first time window.

A time domain unit of the first time window is not limited in embodiments of the present application. In an embodiment, the time domain unit of the first time window may be a slot. In an embodiment, the time domain unit of the first time window may be a multi-carrier symbol. In other words, a granularity (or granularity unit) of the first time window is not limited in embodiments of the present application. In an embodiment, the granularity of the first time window is a slot. In an embodiment, the granularity of the first time window is a multi-carrier symbol.

An expression manner of the length of the first time window is not limited in embodiments of the present application. In an embodiment, the length of the first time window may be expressed in slots. In an embodiment, the length of the first time window may be expressed in multi-carrier symbols. In an embodiment, the length of the first time window may be expressed in subframes. In an embodiment, the length of the first time window may be expressed in milliseconds. In an embodiment, the length of the first time window may be expressed in seconds. It should be noted that the expression manners mentioned above are merely examples, and the length of the first time window may also be expressed in other ways not listed herein.

The length of the first time window is not specifically limited in embodiments of the present application. The following is described by using the length of the first time window expressed in slots or milliseconds as an example.

In an embodiment, the length of the first time window includes at least one slot, for example, includes 5 slots, 10 slots, or the like. In other words, the length of the first time window includes a plurality of slots, for example, includes two or more slots.

In an embodiment, the length of the first time window is less than or equal to 10 milliseconds.

In an embodiment, the length of the first time window is less than or equal to 40 milliseconds.

Certainly, the length of the first time window may alternatively be other values, which is not limited in embodiments of the present application.

In a possible implementation, on one or more transmission occasions (for example, on the first transmission occasion or on a plurality of transmission occasions including the first transmission occasion), when a conflict occurs between multiple PRACH transmissions in a random access attempt and another uplink transmission, forgoing the multiple PRACH transmissions or forgoing the another uplink transmission may be considered, or reducing transmit power of the multiple PRACH transmissions or reducing transmit power of the another uplink transmission may be considered.

Consideration of forgoing the multiple PRACH transmissions or reducing the transmit power of the multiple PRACH transmissions is used as an example, and the following two solutions can be considered.

- Solution 1: The user equipment forgoes all PRACH transmissions in one random access attempt, or reduces transmit power of all PRACH transmissions in one random access attempt.
- Solution 2: The user equipment forgoes a PRACH transmission that collides with the another uplink transmission in one random access attempt, or reduces transmit power of a PRACH transmission that collides with the another uplink transmission in one random access attempt.

In this case, there exist problems still needing to be resolved: how to determine whether to forgo multiple PRACH transmissions or whether to forgo a PRACH transmission, which encounters a conflict, in the multiple PRACH transmissions, or how to determine whether to reduce transmit power of multiple PRACH transmissions or whether to reduce transmit power of a PRACH transmission, which encounters a conflict, in the multiple PRACH transmissions.

In view of the foregoing problems, embodiments of the present application provide several solutions, which are described below.

In an embodiment, each of the at least one uplink transmission (the at least one uplink transmission transmitted on the first transmission occasion) is one of a plurality of uplink transmissions to be performed. The plurality of uplink transmissions to be performed are described below.

In an embodiment, the plurality of uplink transmissions to be performed refer to uplink transmissions needing to be transmitted on one or more transmission occasions. For example, the plurality of uplink transmissions to be performed refer to uplink transmissions needing to be transmitted on the first transmission occasion.

In an embodiment, the at least one uplink transmission is an uplink transmission that is determined from the plurality of uplink transmissions to be performed and that is transmitted on the first transmission occasion. In other words, the at least one uplink transmission is a part of or all of the plurality of uplink transmissions to be performed.

In an embodiment, the plurality of uplink transmissions to be performed include one or more of following: a PUSCH transmission, a PUCCH transmission, a PRACH transmission, and an SRS transmission.

In an embodiment, the plurality of uplink transmissions to be performed include one or more of following: a PUSCH with higher priority transmission, a PUSCH with lower priority transmission, a PUCCH with higher priority transmission, a PUSCH with lower priority transmission, a PRACH transmission, and an SRS transmission.

In an embodiment, the plurality of uplink transmissions to be performed include a PUSCH transmission, a PUCCH transmission, and a PRACH transmission, and the at least one uplink transmission includes a PUSCH transmission and a PUCCH transmission or includes a PUCCH transmission and a PRACH transmission.

In an embodiment, when the plurality of uplink transmissions to be performed include a PRACH transmission, the PRACH transmission included in the plurality of uplink transmissions to be performed is one or more of following: a single PRACH transmission and multiple PRACH transmissions. For example, the plurality of uplink transmissions to be performed include multiple PRACH transmissions; or the plurality of uplink transmissions to be performed include a single PRACH transmission and multiple PRACH transmissions.

In an embodiment, when the plurality of uplink transmissions to be performed include a PRACH transmission, the PRACH transmission included in the plurality of to-be-transmitted uplink transmission includes one or more of following: a PRACH transmission in a first PRACH transmission group and a PRACH transmission in a second PRACH transmission group. The first PRACH transmission group and the second PRACH transmission group belong to the plurality of PRACH transmission groups.

In an embodiment, when the plurality of uplink transmissions to be performed include a PRACH transmission, the PRACH transmission included in the plurality of uplink transmissions to be performed includes one or more of following: a PRACH transmission in a first PRACH transmission group, a PRACH transmission in a second PRACH transmission group, and a PRACH transmission in a third PRACH transmission group. The first PRACH transmission group, the second PRACH transmission group, and the third PRACH transmission group belong to the plurality of PRACH transmission groups.

In an embodiment, each of the plurality of uplink transmissions to be performed is one of the plurality of candidate transmissions. In other words, the plurality of uplink transmissions to be performed are a part or all of the candidate transmissions.

In an embodiment, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an embodiment, the transmission group to which the first PRACH transmission belongs is the first PRACH transmission group, and if a total transmit power of the plurality of uplink transmissions to be performed exceeds a maximum transmit power of the first node on one or more transmission occasions, a priority of any PRACH transmission in the first PRACH transmission group and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs. In other words, a priority of the first PRACH transmission group and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an embodiment, the plurality of uplink transmissions to be performed include a PUSCH transmission, a PUCCH transmission, and the first PRACH transmission, and a priority of the PUCCH transmission is higher than a priority of the PUSCH transmission. If a total transmit power of the uplink transmissions to be performed exceeds a maximum transmit power of the first node on one or more transmission occasions, a priority of any PRACH transmission in the PRACH transmission group to which the first PRACH transmission belongs and the priority of the PUCCH transmission are used to determine whether to forgo the PRACH transmission group to which the first PRACH transmission belongs or whether to reduce transmit power of the PRACH transmission group to which the first PRACH transmission belongs.

In an embodiment, when a conflict occurs between the first PRACH transmission and a plurality of other transmissions, the priority of the PRACH transmission group to which the first PRACH transmission belongs and a priority of a transmission with the highest priority in the plurality of other transmissions are used to determine whether to forgo the transmission group to which the first PRACH transmission belongs or whether to reduce transmit power of the transmission group to which the first PRACH transmission belongs.

In an embodiment, the PRACH transmission group to which the first PRACH transmission belongs includes multiple PRACH transmissions, and when a conflict occurs between the first PRACH transmission and a plurality of other transmissions, a priority of any PRACH transmission in the PRACH transmission group to which the first PRACH transmission belongs and a priority of a transmission with the highest priority in the plurality of other transmissions are used to determine whether to forgo the transmission group to which the first PRACH transmission belongs or whether to reduce transmit power of the transmission group to which the first PRACH transmission belongs.

In other words, when a conflict occurs between different PRACH transmissions in multiple PRACH transmissions (for example, the PRACH transmission group to which the first PRACH transmission belongs) and a plurality of other uplink transmissions (for example, when a conflict occurs between different PRACH transmissions in the multiple PRACH transmissions and a plurality of other uplink transmissions on different transmission occasions), whether to forgo the multiple PRACH transmissions or whether to reduce transmit power of the multiple PRACH transmissions depends on a comparison between a priority of the multiple PRACH transmissions and a priority of an uplink transmission with the highest priority in the plurality of other uplink transmissions.

FIG. 2 is used as an example. In the example of FIG. 2, a conflict occurs between multiple PRACH transmissions and another uplink transmission 1 (for example, a PUCCH transmission) and between multiple PRACH transmissions and another uplink transmission 2 (for example, a PUSCH transmission) in the figure, where a priority of the another uplink transmission 1 is higher than a priority of the another uplink transmission 2. Therefore, in a case that a conflict occurs between the multiple PRACH transmissions and the another uplink transmission 1 and the another uplink transmission 2, whether to forgo the multiple PRACH transmissions or whether to reduce transmit power of the multiple PRACH transmissions may be determined by comparing a priority of the multiple PRACH transmissions with the priority of the another uplink transmission 1.

In an embodiment, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

In an embodiment, "a part of PRACH transmissions in the PRACH transmission group to which the first PRACH transmission belongs" refers to a PRACH transmission, which encounters a conflict, in the PRACH transmission group to which the first PRACH transmission belongs.

In an embodiment, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a PRACH transmission, which encounters a conflict, in the PRACH transmission group to which the first PRACH transmission belongs or whether to reduce transmit power of a PRACH transmission, which encounters a conflict, in the PRACH transmission group to which the first PRACH transmission belongs.

In an embodiment, the transmission group to which the first PRACH transmission belongs is the first PRACH transmission group, and if a total transmit power of the plurality of uplink transmissions to be performed exceeds a maximum transmit power of the first node on one or more transmission occasions, a priority of any PRACH transmission in the first PRACH transmission group and a priority of each of the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs. In other words, a priority of the first PRACH transmission group and the priority of each of the plurality of uplink transmissions to be performed are used to determine whether to forgo a part of PRACH transmission in the PRACH transmission group to which the first PRACH transmission belongs or whether to reduce transmit power of a part of PRACH transmissions in the PRACH transmission group to which the first PRACH transmission belongs.

In an embodiment, the plurality of uplink transmissions to be performed include a PUSCH transmission, a PUCCH transmission, and the first PRACH transmission. A conflict occurs between PRACH transmission A (for example, the first PRACH transmission) in the PRACH transmission group to which the first PRACH transmission belongs and the PUSCH transmission, and a conflict occurs between PRACH transmission B in the PRACH transmission group to which the first PRACH transmission belongs and the PUCCH transmission. If a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of the PUSCH transmission are used to determine whether to forgo PRACH transmission A in the PRACH transmission group to which the first PRACH transmission belongs or whether to reduce transmit power of PRACH transmission A in the PRACH transmission group to which the first PRACH transmission belongs, and the priority of any PRACH transmission in the PRACH transmission group to which the first PRACH transmission belongs and a priority of the PUCCH transmission are used to determine whether to forgo PRACH transmission B in the PRACH transmission group to which the first PRACH transmission belongs or whether to reduce transmit power of PRACH transmission B in the PRACH transmission group to which the first PRACH transmission belongs.

In an embodiment, when a conflict occurs between the first PRACH transmission and a plurality of other transmissions, the priority of the PRACH transmission group to which the first PRACH transmission belongs and a priority of each transmission in the plurality of other transmissions are used to determine whether to forgo a PRACH transmission, which encounters a conflict, in the transmission group to which the first PRACH transmission belongs or whether to reduce a transmit power of a PRACH transmission, which encounters a conflict, in the transmission group to which the first PRACH transmission belongs.

In an embodiment, the PRACH transmission group to which the first PRACH transmission belongs includes multiple PRACH transmissions, and when a conflict occurs between the first PRACH transmission and a plurality of other transmissions, the priority of the PRACH transmission group to which the first PRACH transmission belongs and a priority of each transmission in the plurality of other transmissions are used to determine whether to forgo a PRACH transmission, which encounters a conflict, in the transmission group to which the first PRACH transmission belongs or whether to reduce transmit power of a PRACH transmission, which encounters a conflict, in the transmission group to which the first PRACH transmission belongs.

In other words, when a conflict occurs between different PRACH transmissions in multiple PRACH transmissions (for example, the PRACH transmission group to which the first PRACH transmission belongs) and a plurality of other uplink transmissions (for example, when a conflict occurs between different PRACH transmissions in the multiple PRACH transmissions and a plurality of other uplink transmissions on different transmission occasions), whether to forgo or whether to reduce transmit power of a PRACH transmission, which encounters a conflict, in the multiple PRACH transmissions depends on a comparison between a priority of the multiple PRACH transmissions and a priority of each transmission in the plurality of other uplink transmissions.

FIG. 2 is still used as an example. In the example of FIG. 2, a conflict occurs between multiple PRACH transmissions and another uplink transmission 1 (for example, a PUCCH transmission) and between multiple PRACH transmissions and another uplink transmission 2 (for example, a PUSCH transmission) in the figure, where a priority of the another uplink transmission 1 is higher than a priority of the another uplink transmission 2. Therefore, in a case that a conflict occurs between the multiple PRACH transmissions and the another uplink transmission 1 and the another uplink transmission 2, whether to forgo a PRACH transmission, which collides with the another uplink transmission 1, in the multiple PRACH transmissions or whether to reduce transmit power of the PRACH transmission, which collides with the another uplink transmission 1, in the multiple PRACH transmissions may be determined by comparing the priority of the multiple PRACH transmissions with the priority of the another uplink transmission 1. Whether to forgo a PRACH transmission, which collides with the another uplink transmission 2, in the multiple PRACH transmissions or whether to reduce transmit power of the PRACH transmission, which collides with the another uplink transmission 2, in the multiple PRACH transmissions is determined by comparing the priority of the multiple PRACH transmissions with the priority of the another uplink transmission 2.

The method for a first node used for wireless communication according to embodiments of the present application is described above from the perspective of the first node with reference to FIG. 3. A method for a second node used for wireless communication according to embodiments of the present application is described below from the perspective of a second node with reference to FIG. 4. It should be understood that descriptions of the first node and the second node correspond to each other, and therefore, for a part that is not described in detail, reference may be made to the foregoing descriptions.

In an embodiment, the second node may be a node that receives at least one uplink transmission in a communication system.

In an embodiment, the second node may be a base station.

In an embodiment, the second node may include a first receiving set.

In an embodiment, the second node may include a first transmitting set and a second transmitting set.

FIG. 4 is a schematic flowchart of a method for a second node used for wireless communication according to an embodiment of the present application. The method shown in FIG. 4 may include Step S410.

In Step S410, at least one uplink transmission is received. The at least one uplink transmission is transmitted on a first transmission occasion.

Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first PRACH transmission, and the first PRACH transmission belongs to one of a plurality of PRACH transmission groups; and a priority of the first PRACH transmission is related to a PRACH transmission group to which the first PRACH transmission belongs.

In an embodiment, the priority of the first PRACH transmission is related to both the PRACH transmission group to which the first PRACH transmission belongs and a cell in which the first PRACH transmission is located.

In an embodiment, the priority of the first PRACH transmission is related to the carrier in which the first PRACH transmission is performed.

In an embodiment, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an embodiment, the plurality of PRACH transmission groups respectively correspond to a plurality of priority indexes, and the priority of the first PRACH transmission is related to a priority index corresponding to the PRACH transmission group to which the first PRACH transmission belongs.

In an embodiment, the at least one uplink transmission includes the first PRACH transmission, and the method further includes: transmitting a first random response during a first time window in response to receiving the first PRACH transmission, where a starting of the first time window is related to the PRACH transmission group to which the first PRACH transmission belongs.

In an embodiment, the priority of the first PRACH transmission is related to a priority index of the first PRACH transmission, and the priority index of the first PRACH transmission is related to the PRACH transmission group to which the first PRACH transmission belongs.

In an embodiment, the method includes: transmitting first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an embodiment, the priority of the first PRACH transmission satisfies one or more of following: the priority of the first PRACH transmission is higher than a priority of a PUSCH transmission; the priority of the first PRACH transmission is higher than a priority of a PUCCH transmission; and the priority of the first PRACH transmission is higher than a priority of an SRS transmission.

In an embodiment, the PUSCH transmission includes a PUSCH with higher priority transmission and a PUSCH with lower priority transmission, the PUCCH transmission includes a PUCCH with higher priority transmission and a PUCCH with lower priority transmission, and the priority of the first PRACH transmission satisfies one or more of the following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. If the PRACH transmission group to which the first PRACH transmission belongs is the first PRACH transmission group, the priority of the first PRACH transmission is higher than a priority of each PRACH transmission in the second PRACH transmission group. If the PRACH transmission group to which the first PRACH transmission belongs is the second PRACH transmission group, the priority of the first PRACH transmission is lower than a priority of each PRACH transmission in the first PRACH transmission group.

In an embodiment, the first priority order is predefined or network-configured.

In an embodiment, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an embodiment, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

The methods embodiments of the present application are described in detail above with reference to FIG. 1 to FIG. 4. Apparatus embodiments of the present application are described in detail below with reference to FIG. 5 and FIG. 8. It should be understood that the description of the method embodiments corresponds to the description of the apparatus embodiments, and therefore, for parts that are not described in detail, reference may be made to the foregoing method embodiments.

FIG. 5 is a schematic structural diagram of a node used for wireless communication according to an embodiment of the present application. A node 500 shown in FIG. 5 may be any first node described above. The node 500 may include a first transmitting set 510.

The first transmitting set 510 may be configured to transmit at least one uplink transmission on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first PRACH transmission, and the first PRACH transmission belongs to one of a plurality of PRACH transmission groups; and a priority of the first PRACH transmission is related to a PRACH transmission group to which the first PRACH transmission belongs.

In an embodiment, the priority of the first PRACH transmission is related to both the PRACH transmission group to which the first PRACH transmission belongs and a cell in which the first PRACH transmission is located.

In an embodiment, the priority of the first PRACH transmission is related to the carrier in which the first PRACH transmission is performed.

In an embodiment, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an embodiment, the plurality of PRACH transmission groups respectively correspond to a plurality of priority indexes, and the priority of the first PRACH transmission is related to a priority index corresponding to the PRACH transmission group to which the first PRACH transmission belongs.

In an embodiment, the at least one uplink transmission includes the first PRACH transmission, and the first node further includes: a first receiving set 520, configured to monitor a first random response during a first time window in response to transmitting the first PRACH transmission, where a starting of the first time window is related to the PRACH transmission group to which the first PRACH transmission belongs.

In an embodiment, the priority of the first PRACH transmission is related to a priority index of the first PRACH transmission, and the priority index of the first PRACH transmission is related to the PRACH transmission group to which the first PRACH transmission belongs.

In an embodiment, the node 500 includes: a second receiving set, configured to receive first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an embodiment, the priority of the first PRACH transmission satisfies one or more of following: the priority of the first PRACH transmission is higher than a priority of a PUSCH transmission; the priority of the first PRACH transmission is higher than a priority of a PUCCH transmission; and the priority of the first PRACH transmission is higher than a priority of an SRS transmission.

In an embodiment, the PUSCH transmission includes a PUSCH with higher priority transmission and a PUSCH with lower priority transmission, the PUCCH transmission includes a PUCCH with higher priority transmission and a PUCCH with lower priority transmission, and the priority of the first PRACH transmission satisfies one or more of the following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. If the PRACH transmission group to which the first PRACH transmission belongs is the first PRACH transmission group, the priority of the first PRACH transmission is higher than a priority of each PRACH transmission in the second PRACH transmission group. If the PRACH transmission group to which the first PRACH transmission belongs is the second PRACH transmission group, the priority of the first PRACH transmission is lower than a priority of each PRACH transmission in the first PRACH transmission group.

In an embodiment, the first priority order is predefined or network-configured.

In an embodiment, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an embodiment, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

Figure 7:
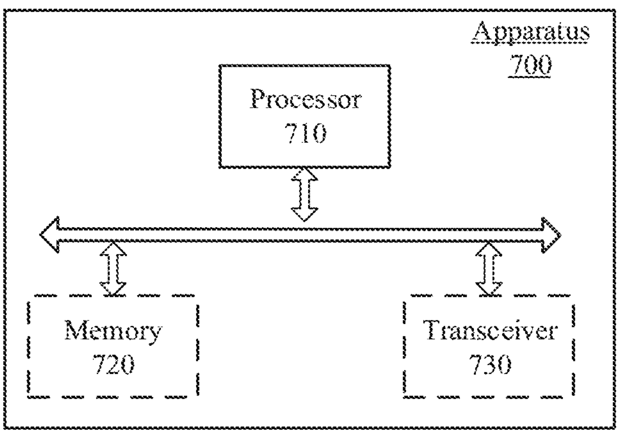
FIG. 7 is a schematic structural diagram of an apparatus according to an embodiment of the present application.

In an embodiment, the first transmitting set 510 may be a transceiver 730. The first node 500 may further include a processor 710 and a memory 720. Details are shown in FIG. 7.

FIG. 6 is a schematic structural diagram of a node used for wireless communication according to another embodiment of the present application. A node 600 shown in FIG. 6 may be any second node described above. The node 600 may include a first receiving set 610.

The first receiving set 610 may be configured to receive at least one uplink transmission, where the at least one uplink transmission is transmitted on a first transmission occasion. Each of the at least one uplink transmission is one of a plurality of candidate transmissions; a priority of each of the plurality of candidate transmissions is related to a first priority order; the first priority order is used to allocate power to the at least one uplink transmission; the plurality of candidate transmissions include a first PRACH transmission, and the first PRACH transmission belongs to one of a plurality of PRACH transmission groups; and a priority of the first PRACH transmission is related to a PRACH transmission group to which the first PRACH transmission belongs.

In an embodiment, the priority of the first PRACH transmission is related to both the PRACH transmission group to which the first PRACH transmission belongs and a cell in which the first PRACH transmission is located.

In an embodiment, the priority of the first PRACH transmission is related to the carrier in which the first PRACH transmission is performed.

In an embodiment, numbers of PRACH transmissions included in any two of the plurality of PRACH transmission groups are different, and the priority of the first PRACH transmission is related to a number of PRACH transmissions included in the PRACH transmission group to which the first PRACH transmission belongs.

In an embodiment, the plurality of PRACH transmission groups respectively correspond to a plurality of priority indexes, and the priority of the first PRACH transmission is related to a priority index corresponding to the PRACH transmission group to which the first PRACH transmission belongs.

In an embodiment, the at least one uplink transmission includes the first PRACH transmission, and the second node further includes: a first transmitting set 620, configured to transmit a first random response during a first time window in response to transmitting the first PRACH transmission, where a starting of the first time window is related to the PRACH transmission group to which the first PRACH transmission belongs.

In an embodiment, the priority of the first PRACH transmission is related to a priority index of the first PRACH transmission, and the priority index of the first PRACH transmission is related to the PRACH transmission group to which the first PRACH transmission belongs.

In an embodiment, the second node includes: a second transmitting set, configured to transmit first configuration signaling, where the first configuration signaling is used to determine a plurality of candidate orders, and the first priority order is one of the plurality of candidate orders; and the PRACH transmission group to which the first PRACH transmission belongs is used to determine the first priority order from the plurality of candidate orders.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group; the plurality of candidate orders include a first candidate order and a second candidate order, and the first priority order is one of the first candidate order and the second candidate order; and when the first PRACH transmission belongs to the first PRACH transmission group, the first priority order is the first candidate order; or when the first PRACH transmission belongs to the second PRACH transmission group, the first priority order is the second candidate order.

In an embodiment, the priority of the first PRACH transmission satisfies one or more of following: the priority of the first PRACH transmission is higher than a priority of a PUSCH transmission; the priority of the first PRACH transmission is higher than a priority of a PUCCH transmission; and the priority of the first PRACH transmission is higher than a priority of an SRS transmission.

In an embodiment, the PUSCH transmission includes a PUSCH with higher priority transmission and a PUSCH with lower priority transmission, the PUCCH transmission includes a PUCCH with higher priority transmission and a PUCCH with lower priority transmission, and the priority of the first PRACH transmission satisfies one or more of the following: the priority of the first PRACH transmission is higher than that of the PUSCH with higher priority transmission; the priority of the first PRACH transmission is higher than that of the PUCCH with higher priority transmission; the priority of the first PRACH transmission is higher than that of the PUSCH with lower priority transmission; the priority of the first PRACH transmission is higher than that of the PUCCH with lower priority transmission; the priority of the first PRACH transmission is lower than that of the PUSCH with higher priority transmission and higher than that of the PUSCH with lower priority transmission; the priority of the first PRACH transmission is lower than that of the PUCCH with higher priority transmission and higher than that of the PUCCH with lower priority transmission; the priority of the first PRACH transmission is lower than that of the PUSCH with lower priority transmission; and the priority of the first PRACH transmission is lower than that of the PUCCH with lower priority transmission.

In an embodiment, the plurality of PRACH transmission groups include a first PRACH transmission group and a second PRACH transmission group, and a number of PRACH transmissions included in the first PRACH transmission group is greater than a number of PRACH transmissions included in the second PRACH transmission group. If the PRACH transmission group to which the first PRACH transmission belongs is the first PRACH transmission group, the priority of the first PRACH transmission is higher than a priority of each PRACH transmission in the second PRACH transmission group. If the PRACH transmission group to which the first PRACH transmission belongs is the second PRACH transmission group, the priority of the first PRACH transmission is lower than a priority of each PRACH transmission in the first PRACH transmission group.

In an embodiment, the first priority order is predefined or network-configured.

In an embodiment, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a transmission with the highest priority in other transmissions in the plurality of uplink transmissions to be performed are used to determine whether to forgo the PRACH transmission group to which the first PRACH transmission belongs or whether to reduce transmit power of the PRACH transmission group to which the first PRACH transmission belongs.

In an embodiment, the at least one uplink transmission is transmitted by a first node, each of the at least one uplink transmission is one of a plurality of uplink transmissions to be performed, the plurality of uplink transmissions to be performed include the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of other transmissions in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

In an embodiment, the first receiving set 610 may be a transceiver 730. The second node 600 may further include a processor 710 and a memory 720. Details are shown in FIG. 7.

FIG. 7 is a schematic structural diagram of a communication apparatus according to an embodiment of the present application. The dashed lines in FIG. 7 indicate that the unit or module is optional. The apparatus 700 may be configured to implement the methods described in the foregoing method embodiments. The apparatus 700 may be a chip, a user equipment, or a network device.

The apparatus 700 may include one or more processors 710. The processor 710 may allow the apparatus 700 to implement the methods described in the foregoing method embodiments. The processor 710 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 700 may further include one or more memories 720. The memory 720 stores a program that may be executed by the processor 710, so that the processor 710 performs the method described in the foregoing method embodiments. The memory 720 may be independent of the processor 710 or may be integrated into the processor 710.

The apparatus 700 may further include a transceiver 730. The processor 710 may communicate with another device or chip through the transceiver 730. For example, the processor 710 may transmit data to and receive data from another device or chip by using the transceiver 730.

Figure 8:
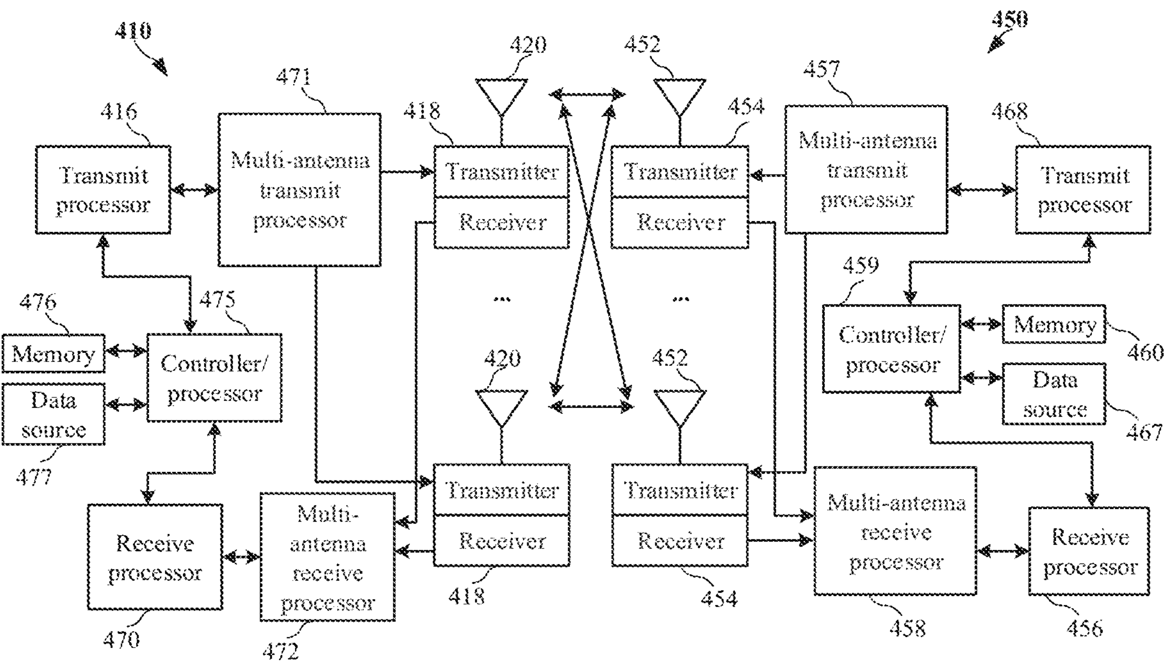
FIG. 8 is a schematic diagram of hardware modules of a communication device according to an embodiment of the present application.

FIG. 8 is a schematic diagram of hardware modules of a communication device according to an embodiment of the present application. Specifically, FIG. 8 is a block diagram of a first communication device 450 and a second communication device 410 communicating with each other in an access network.

The first communication device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

The second communication device 410 includes a controller/processor 475, a memory 476, a data source 477, a receive processor 470, a transmit processor 416, a multi-antenna receive processor 472, a multi-antenna transmit processor 471, transmitters/receivers 418, and antennas 420.

During transmission from the second communication device 410 to the first communication device 450, at the second communication device 410, an upper layer data packet from a core network or an upper layer data packet from the data source 477 is provided to the controller/processor 475. The core network and the data source 477 represent all protocol layers above an L2 layer. The controller/processor 475 implements a function of the L2 layer. During transmission from the second communication device 410 to the first communication device 450, the controller/processor 475 provides header compression, encryption, packet segmentation and reordering, multiplexing between a logical channel and a transport channel, and allocation of radio resources of the first communication device 450 based on various priority measurements. The controller/processor 475 is further responsible for retransmission of a lost packet, and signaling to the first communication device 450. The transmit processor 416 and the multi-antenna transmit processor 471 implement various signal processing functions of an L1 layer (namely, a physical layer). The transmit processor 416 implements encoding and interleaving to facilitate forward error correction at the second communication device 410, and mapping of signal clusters based on various modulation schemes (such as binary phase shift keying, quadrature phase shift keying, M-phase shift keying, and M-quadrature amplitude modulation). The multi-antenna transmit processor 471 performs digital space precoding, including codebook-based precoding and non-codebook-based precoding, on a coded and modulated symbol, and beamforming processing, to generate one or more spatial streams. The transmit processor 416 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

During transmission from the second communication device 410 to the first communication device 450, at the first communication device 450, each receiver 454 receives a signal through a corresponding antenna 452 of the receiver 454. Each receiver 454 recovers information modulated onto a radio frequency carrier, converts a radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time domain to frequency domain via fast Fourier transform, the baseband multi-carrier symbol stream obtained after the operation of analog precoding receiving/beamforming. In frequency domain, a physical-layer data signal and a reference signal are demultiplexed by the receive processor 456. The reference signal is used for channel estimation; and the data signal is recovered after multi-antenna detection performed by the multi-antenna receive processor 458, to obtain any spatial stream that uses the first communication device 450 as a destination. Symbols on each spatial stream are demodulated and recovered in the receive processor 456, and a soft decision is generated. The receive processor 456 then decodes and de-interleaves the soft decision to recover upper layer data and a control signal transmitted by the second communication device 410 on a physical channel. The upper layer data and the control signal are then provided to the controller/processor 459. The controller/processor 459 implements functions of the L2 layer. The controller/processor 459 may be associated with the memory 460 that stores program code and data. The memory 460 may be referred to as a computer-readable medium. During transmission from the second communication device 410 to the first communication device 450, the controller/processor 459 provides demultiplexing between a transport channel and a logical channel, packet reassembly, decryption, header decompression, and control signal processing, to recover an upper layer data packet from the second communication device 410. The upper layer packet is then provided to all protocol layers above the L2 layer, or various control signals may be provided to the L3 layer for processing by the L3 layer.

During transmission from the first communication device 450 to the second communication device 410, at the first communication device 450, an upper layer data packet is provided to the controller/processor 459 by using the data source 467. The data source 467 represents all protocol layers above the L2 layer. Similar to the transmit function, at the second communication device 410, described during the transmission from the second communication device 410 to the first communication device 450, the controller/processor 459 implements header compression, encryption, packet segmentation and reordering, and multiplexing between a logical channel and a transport channel, to implement an L2 layer function for a user plane and a control plane. The controller/processor 459 is further responsible for retransmission of a lost packet, and signaling to the second communication device 410. The transmit processor 468 performs modulation mapping and channel coding processing, and the multi-antenna transmit processor 457 performs digital multi-antenna spatial precoding, including codebook-based precoding and non-codebook-based precoding, and beam forming processing. Then the transmit processor 468 modulates a generated spatial stream into a multi-carrier/single-carrier symbol stream, and the multi-carrier/single-carrier symbol stream is provided to different antennas 452 by using the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream for the antenna 452.

During transmission from the first communication device 450 to the second communication device 410, a function at the second communication device 410 is similar to the receive function, at the first communication device 450, described during the transmission from the second communication device 410 to the first communication device 450. Each receiver 418 receives a radio frequency signal through a corresponding antenna 420 of the receiver 418, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with a memory 476 that stores program code and data. The memory 476 may be referred to as a computer-readable medium. During transmission from the first communication device 450 to the second communication device 410, the controller/processor 475 provides demultiplexing between a transport channel and a logical channel, packet reassembly, decryption, header decompression, and control signal processing, to recover an upper layer data packet from the first communication device 450. The upper layer data packet from the controller/processor 475 may be provided to a core network or all protocol layers above the L2 layer, or various control signals may be provided to the core network or the L3 layer for processing by the L3 layer.

In an embodiment, the first communication device 450 includes: at least one processor and at least one memory, and the at least one memory includes computer program code. The at least one memory and the computer program code are configured to be used together with the at least one processor together. The first communication device 450 is at least configured to: transmit at least one uplink transmission on a first transmission occasion. Each of the at least one uplink transmission is one of a plurality of candidate transmissions; a priority order of the plurality of candidate transmissions is used to allocate power to the at least one uplink transmission; the plurality of candidate transmissions include a first physical random access channel PRACH transmission, and the first PRACH transmission belongs to one of a plurality of PRACH transmission groups; and a priority of the first PRACH transmission is related to a PRACH transmission group to which the first PRACH transmission belongs.

In an embodiment, the first communication device 450 includes: a memory storing a computer-readable instruction program. An action is generated when the computer-readable instruction program is executed by at least one processor, where the action includes: transmitting at least one uplink transmission on a first transmission occasion. Each of the at least one uplink transmission is one of a plurality of candidate transmissions; a priority order of the plurality of candidate transmissions is used to allocate power to the at least one uplink transmission; the plurality of candidate transmissions include a first physical random access channel PRACH transmission, and the first PRACH transmission belongs to one of a plurality of PRACH transmission groups; and a priority of the first PRACH transmission is related to a PRACH transmission group to which the first PRACH transmission belongs.

In an embodiment, the first communication device 450 corresponds to the first node in the present application.

In an embodiment, the second communication device 410 corresponds to the second node in the present application.

In an embodiment, the first communication device 450 is a user equipment.

In an embodiment, the first communication device 450 is an NCR.

In an embodiment, the first communication device 450 is a wireless repeater.

In an embodiment, the first communication device 450 is a relay.

In an embodiment, the first communication device 450 is a user equipment that supports V2X.

In an embodiment, the first communication device 450 is a user equipment that supports D2D.

In an embodiment, the second communication device 410 is a base station.

In an embodiment, the antenna 452, the transmitter 454, the multi-antenna transmit processor 457, the transmit processor 468, and the controller/processor 459 are configured to transmit the at least one uplink transmission in the present application.

In an embodiment, the antenna 420, the receiver 418, the multi-antenna receive processor 472, the receive processor 470, and the controller/processor 475 are configured to receive the at least one uplink transmission in the present application.

In an embodiment, the antenna 452, the receiver 454, the multi-antenna receive processor 458, the receive processor 456, and the controller/processor 459 are configured to monitor the first random response in the present application.

In an embodiment, the antenna 420, the transmitter 418, the multi-antenna transmit processor 471, the transmit processor 416, and the controller/processor 475 are configured to transmit the first random response in the present application.

An embodiment of the present application further provides a computer-readable storage medium for storing a program. The computer-readable storage medium may be applied to the terminal or the network device provided in embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in embodiments of the present application, and the program causes a computer to perform the methods to be performed by the terminal or the network device in various embodiments of the present application.

An embodiment of the present application further provides a computer program. The computer program may be applied to the terminal or the network device provided in embodiments of the present application, and the computer program causes a computer to perform the methods to be performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, "B corresponding to A" means that B is associated with A, and B may be determined based on A. However, it should also be understood that, determining B based on A does not mean determining B based only on A, but instead B may be determined based on A and/or other information.

In embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, "predefined" or "pre-configured" may be implemented by pre-storing corresponding code, tables, or other forms that may be used to indicate related information in devices (for example, including a user equipment and a network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communication system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual requirements to achieve the objectives of the solutions of the embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first node, comprising:

at least one processor; and one or more non-transitory computer-readable storage media coupled to the at least one processor and storing programming instructions for execution by the at least one processor, wherein the programming instructions, when executed, cause the first node to perform operations comprising:

transmitting at least one uplink transmission on a first transmission occasion;

wherein each of the at least one uplink transmission is one of a plurality of candidate transmissions; a power of each of the at least one uplink transmission is allocated according to a priority of the respective uplink transmission in a first priority order; the plurality of candidate transmissions comprise a first physical random access channel (PRACH) transmission that comprises a plurality of repeatedly transmitted preambles over a plurality of PRACH occasions, wherein each of the plurality of repeatedly transmitted preambles corresponds to a different PRACH occasion in the plurality of PRACH occasions, and the first PRACH transmission belongs to one of a plurality of PRACH transmission groups; wherein the plurality of PRACH transmission groups include a first PRACH transmission group, a second PRACH transmission group, and a third PRACH transmission group that each corresponds to a different priority; and wherein the operations comprise:

receiving first configuration signaling, wherein the first configuration signaling indicates a plurality of candidate orders, and the first priority order is one of the plurality of candidate orders; and the PRACH transmission group to which the first PRACH transmission belongs is used to determine the first priority order from the plurality of candidate orders.

2. The first node according to claim 1, wherein the priority of the first PRACH transmission is the same as a priority of the PRACH transmission group to which the first PRACH transmission belongs.

3. The first node according to claim 1, wherein the priority of the first PRACH transmission is determined based on both the PRACH transmission group to which the first PRACH transmission belongs and a cell in which the first PRACH transmission is located.

4. The first node according to claim 1, wherein the priority of the first PRACH transmission is determined based on a carrier in which the first PRACH transmission is performed.

5. The first node according to claim 1, wherein numbers of PRACH transmissions comprised in any two of the plurality of PRACH transmission groups are different, and the priority of the first PRACH transmission is determined based on a number of PRACH transmissions comprised in the PRACH transmission group to which the first PRACH transmission belongs.

6. The first node according to claim 1, wherein the plurality of PRACH transmission groups respectively correspond to a plurality of priority indexes, and the priority of the first PRACH transmission is determined based on a priority index corresponding to the PRACH transmission group to which the first PRACH transmission belongs.

7. The first node according to claim 1, wherein the at least one uplink transmission comprises the first PRACH transmission, and the operations comprise:

monitoring a first random access response during a first time window in response to the first PRACH transmission, wherein a starting of the first time window is determined based on the PRACH transmission group to which the first PRACH transmission belongs.

8. The first node according to claim 1, wherein the priority of the first PRACH transmission is determined based on a priority index of the first PRACH transmission, and the priority index of the first PRACH transmission is determined based on the PRACH transmission group to which the first PRACH transmission belongs.

9. The first node according to claim 1, wherein the plurality of PRACH transmission groups comprise a first PRACH transmission group and a second PRACH transmission group, and a number of PRACH transmissions comprised in the first PRACH transmission group is greater than a number of PRACH transmissions comprised in the second PRACH transmission group; the plurality of candidate orders comprise a first candidate order and a second candidate order, and the first priority order is one of the first candidate order or the second candidate order; and when the first PRACH transmission belongs to the first PRACH transmission group, the first priority order is the first candidate order; or when the first PRACH transmission belongs to the second PRACH transmission group, the first priority order is the second candidate order.

10. The first node according to claim 1, wherein the priority of the first PRACH transmission satisfies one or more of following:

the priority of the first PRACH transmission is higher than a priority of a physical uplink shared channel (PUSCH) transmission;

the priority of the first PRACH transmission is higher than a priority of a physical uplink control channel (PUCCH) transmission; and the priority of the first PRACH transmission is higher than a priority of a sounding reference signal (SRS) transmission.

11. The first node according to claim 1, wherein the first priority order indicates a first PUSCH transmission with higher priority, a second PUSCH transmission with lower priority, a first PUCCH transmission with higher priority, and a second PUCCH transmission with lower priority, and the priority of the first PRACH transmission satisfies one or more of following:

the priority of the first PRACH transmission is higher than that of the first PUSCH transmission;

the priority of the first PRACH transmission is higher than that of the first PUCCH transmission;

the priority of the first PRACH transmission is higher than that of the second PUSCH transmission;

the priority of the first PRACH transmission is higher than that of the second PUCCH transmission;

the priority of the first PRACH transmission is lower than that of the first PUSCH transmission and higher than that of the second PUSCH transmission;

the priority of the first PRACH transmission is lower than that of the first PUCCH transmission and higher than that of the second PUCCH transmission;

the priority of the first PRACH transmission is lower than that of the second PUSCH transmission; or the priority of the first PRACH transmission is lower than that of the second PUCCH transmission.

12. The first node according to claim 1, wherein the plurality of PRACH transmission groups comprise a first PRACH transmission group and a second PRACH transmission group, and a number of PRACH transmissions comprised in the first PRACH transmission group is greater than a number of PRACH transmissions comprised in the second PRACH transmission group; and if the PRACH transmission group to which the first PRACH transmission belongs is the first PRACH transmission group, the priority of the first PRACH transmission is higher than a priority of each PRACH transmission in the second PRACH transmission group;

if the PRACH transmission group to which the first PRACH transmission belongs is the second PRACH transmission group, the priority of the first PRACH transmission is lower than a priority of each PRACH transmission in the first PRACH transmission group.

13. The first node according to claim 1, wherein the first priority order is predefined or is network-configured.

14. The first node according to claim 1, wherein each of the at least one uplink transmission is one of a plurality of uplink transmissions to be performed, the plurality of uplink transmissions to be performed comprise the first PRACH transmission, and if a total transmit power of the plurality of uplink transmissions to be performed exceeds a maximum transmit power of the first node on one or more transmission occasions, a priority of any PRACH transmission in the PRACH transmission group to which the first PRACH transmission belongs and a priority of a uplink transmission with the highest priority in the uplink transmissions other than the first PRACH transmission in the plurality of uplink transmissions to be performed are used to determine whether to forgo the PRACH transmission group to which the first PRACH transmission belongs or whether to reduce transmit power of the PRACH transmission group to which the first PRACH transmission belongs.

15. The first node according to claim 1, wherein each of the at least one uplink transmission is one of a plurality of uplink transmissions to be performed, the plurality of uplink transmissions to be performed comprise the first PRACH transmission, and if a total transmit power of the plurality of uplink transmissions to be performed exceeds a maximum transmit power of the first node on one or more transmission occasions, a priority of each PRACH transmission in the PRACH transmission group to which the first PRACH transmission belongs and a priority of each of uplink transmissions other than the first PRACH transmission in the plurality of uplink transmissions to be performed are used to determine whether to forgo a part of PRACH transmissions in the PRACH transmission group to which the first PRACH transmission belongs or whether to reduce transmit power of a part of PRACH transmissions in the PRACH transmission group to which the first PRACH transmission belongs.

16. A second node, comprising:

at least one processor; and one or more non-transitory computer-readable storage media coupled to the at least one processor and storing programming instructions for execution by the at least one processor, wherein the programming instructions, when executed, cause the second node to perform operations comprising:

receiving at least one uplink transmission, wherein the at least one uplink transmission is transmitted on a first transmission occasion;

wherein each of the at least one uplink transmission is one of a plurality of candidate transmissions; a power of each of the at least one uplink transmission is allocated according to a priority of the respective uplink transmission in a first priority order; the plurality of candidate transmissions comprise a first physical random access channel (PRACH) transmission that comprises a plurality of repeatedly transmitted preambles over a plurality of PRACH occasions, wherein each of the plurality of repeatedly transmitted preambles corresponds to a different PRACH occasion in the plurality of PRACH occasions, and the first PRACH transmission belongs to one of a plurality of PRACH transmission groups; wherein the plurality of PRACH transmission groups include a first PRACH transmission group, a second PRACH transmission group, and a third PRACH transmission group that each corresponds to a different priority; and wherein the operations comprise:

transmitting first configuration signaling, wherein the first configuration signaling indicates a plurality of candidate orders, and the first priority order is one of the plurality of candidate orders; and the PRACH transmission group to which the first PRACH transmission belongs is used to determine the first priority order from the plurality of candidate orders.

17. The second node according to claim 16, wherein the operations comprise: configuring the first priority order.

18. A method, comprising:

transmitting at least one uplink transmission on a first transmission occasion;

wherein each of the at least one uplink transmission is one of a plurality of candidate transmissions; a power of each of the at least one uplink transmission is allocated according to a priority of the respective uplink transmission in a first priority order; the plurality of candidate transmissions comprise a first physical random access channel (PRACH) transmission that comprises a plurality of repeatedly transmitted preambles over a plurality of PRACH occasions, wherein each of the plurality of repeatedly transmitted preambles corresponds to a different PRACH occasion in the plurality of PRACH occasions, and the first PRACH transmission belongs to one of a plurality of PRACH transmission groups; wherein the plurality of PRACH transmission groups include a first PRACH transmission group, a second PRACH transmission group, and a third PRACH transmission group that each corresponds to a different priority; and wherein the method comprises:

receiving first configuration signaling, wherein the first configuration signaling indicates a plurality of candidate orders, and the first priority order is one of the plurality of candidate orders; and the PRACH transmission group to which the first PRACH transmission belongs is used to determine the first priority order from the plurality of candidate orders.

19. The first node according to claim 1, wherein a same priority is used for the plurality of repeatedly transmitted preambles transmitted over the plurality of PRACH occasions by using a same beam.

20. The method according to claim 18, wherein a same priority is used for the plurality of repeatedly transmitted preambles transmitted over the plurality of PRACH occasions by using a same beam.

* * * * *